(12) United States Patent
Free et al.

(10) Patent No.: US 10,590,697 B2
(45) Date of Patent: Mar. 17, 2020

(54) MICROOPTICS FOR GLAZING

(71) Applicant: 3M INNOVATIVE PROPERTIES COMPANY, St. Paul, MN (US)

(72) Inventors: Michael Benton Free, St. Paul, MN (US); Martin B. Wolk, Woodbury, MN (US); Olester Benson, Jr., Woodbury, MN (US); Bing Hao, Woodbury, MN (US); Charles A. Marttila, Shoreview, MN (US); Craig R. Schardt, Woodbury, MN (US); Mieczyslaw H. Mazurek, Roseville, MN (US); Justin P. Meyer, Oakdale, MN (US); Manoj Nirmal, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 132 days.

(21) Appl. No.: 15/111,376

(22) PCT Filed: Jan. 22, 2015

(86) PCT No.: PCT/US2015/012447
§ 371 (c)(1),
(2) Date: Jul. 13, 2016

(87) PCT Pub. No.: WO2015/112708
PCT Pub. Date: Jul. 30, 2015

(65) Prior Publication Data
US 2016/0333634 A1    Nov. 17, 2016

Related U.S. Application Data

(60) Provisional application No. 61/930,161, filed on Jan. 22, 2014.

(51) Int. Cl.
*E06B 9/24* (2006.01)
*B32B 27/16* (2006.01)
(Continued)

(52) U.S. Cl.
CPC ............... *E06B 9/24* (2013.01); *B32B 3/30* (2013.01); *B32B 7/06* (2013.01); *B32B 7/12* (2013.01);
(Continued)

(58) Field of Classification Search
CPC .......... E06B 9/24; F21S 11/007; G02B 5/021; G02B 5/0278
(Continued)

(56) References Cited

U.S. PATENT DOCUMENTS 4,472,480 A    9/1984 Olson
4,567,073 A    1/1986 Larson
(Continued)

FOREIGN PATENT DOCUMENTS

JP    H07096698    4/1995
JP    2000267088    9/2000
(Continued)

OTHER PUBLICATIONS

Buss, "Controlled Angular Redirection of Light via Nanoimprinted Disordered Gratings," Applied Optics, Feb. 2013, vol. 52, No. 4, pp. 709-716.
(Continued)

*Primary Examiner* — Christopher E Mahoney
(74) *Attorney, Agent, or Firm* — Jonathan L. Tolstedt

(57) ABSTRACT

The present disclosure provides lamination transfer films and use of the lamination transfer films, particular in the fabrication of architectural glass elements, such as those used in Insulated Glass Units (IGUs). The lamination transfer films may be used to transfer functional layers and structures. The lamination transfer films may include a support film that can be removed during the transfer process, and the transferred materials are primarily inorganic. The resulting transferred structures on glass generally have high photo- and thermal-stability, and therefore can successfully be applied to the glass surfaces that are interior to the cavity within an IGU. The lamination transfer films can also be patterned such that macroscopic patterns of microoptical elements can be applied on a glass surface.

12 Claims, 10 Drawing Sheets

(51) Int. Cl.

| | | |
|---|---|---|
| *F21S 11/00* | (2006.01) | |
| *B32B 7/12* | (2006.01) | |
| *B32B 3/30* | (2006.01) | |
| *B32B 27/30* | (2006.01) | |
| *B32B 27/08* | (2006.01) | |
| *B32B 27/40* | (2006.01) | |
| *B32B 27/20* | (2006.01) | |
| *B32B 27/28* | (2006.01) | |
| *B32B 7/06* | (2019.01) | |
| *B32B 27/38* | (2006.01) | |
| *B32B 17/06* | (2006.01) | |
| *B32B 27/26* | (2006.01) | |
| *B32B 17/10* | (2006.01) | |
| *E06B 3/66* | (2006.01) | |
| *G02B 5/02* | (2006.01) | |

(52) U.S. Cl.
CPC ...... *B32B 17/064* (2013.01); *B32B 17/10431* (2013.01); *B32B 27/08* (2013.01); *B32B 27/16* (2013.01); *B32B 27/20* (2013.01); *B32B 27/26* (2013.01); *B32B 27/283* (2013.01); *B32B 27/308* (2013.01); *B32B 27/38* (2013.01); *B32B 27/40* (2013.01); *E06B 3/66* (2013.01); *F21S 11/007* (2013.01); *G02B 5/021* (2013.01); *G02B 5/0278* (2013.01); *B32B 2264/102* (2013.01); *B32B 2264/105* (2013.01); *B32B 2307/304* (2013.01); *B32B 2307/308* (2013.01); *B32B 2307/748* (2013.01); *B32B 2405/00* (2013.01); *B32B 2551/00* (2013.01); *E06B 2009/2417* (2013.01)

(58) Field of Classification Search
USPC ....................................................... 359/592
See application file for complete search history.

(56) References Cited

U.S. PATENT DOCUMENTS

| | | | |
|---|---|---|---|
| 4,614,667 A | 9/1986 | Larson | |
| 5,453,104 A | 9/1995 | Schwabel | |
| 5,691,846 A | 11/1997 | Benson, Jr. | |
| 6,329,058 B1 | 12/2001 | Arney | |
| 6,366,013 B1 | 4/2002 | Leenders | |
| 6,376,590 B2 | 4/2002 | Kolb | |
| 6,521,324 B1 | 2/2003 | Debe | |
| 6,597,489 B1 | 7/2003 | Guarr | |
| 6,699,558 B1 | 3/2004 | Milburn | |
| 6,858,253 B2 | 2/2005 | Williams | |
| 6,887,917 B2 | 5/2005 | Yang | |
| 7,241,437 B2 | 7/2007 | Davidson | |
| 7,384,809 B2 | 6/2008 | Donofrio | |
| 7,726,826 B2 * | 6/2010 | Kusano | F21V 5/02 |
| | | | 362/217.05 |
| 7,887,208 B2 * | 2/2011 | Tsukada | G02B 5/0215 |
| | | | 349/62 |
| 7,947,376 B2 | 5/2011 | Sherman | |
| 8,765,881 B2 | 7/2014 | Hays | |
| 9,246,134 B2 | 1/2016 | Schwartz | |
| 9,472,788 B2 | 10/2016 | Collier | |
| 2003/0219992 A1 | 11/2003 | Schaper | |
| 2004/0190102 A1 | 9/2004 | Mullen et al. | |
| 2005/0118352 A1 | 6/2005 | Suwa | |
| 2005/0147838 A1 * | 7/2005 | Olson | C08F 222/1006 |
| | | | 428/522 |
| 2006/0270806 A1 | 11/2006 | Hale | |
| 2007/0042174 A1 | 2/2007 | Rao | |
| 2007/0087167 A1 | 4/2007 | Yoshida | |
| 2008/0292820 A1 | 11/2008 | Padiyath | |
| 2009/0015142 A1 | 1/2009 | Potts | |
| 2009/0256287 A1 | 10/2009 | Fu | |
| 2009/0322219 A1 | 12/2009 | Wolk | |
| 2010/0006211 A1 | 1/2010 | Wolk | |
| 2010/0104807 A1 | 4/2010 | Chiu | |
| 2010/0151207 A1 | 6/2010 | Hansen | |
| 2010/0160577 A1 | 6/2010 | Hirano | |
| 2011/0020640 A1 * | 1/2011 | Sherman | C09J 7/0207 |
| | | | 428/343 |
| 2011/0091694 A1 | 4/2011 | Hayashi | |
| 2011/0151168 A1 * | 6/2011 | Meyer | B32B 27/32 |
| | | | 428/41.3 |
| 2011/0182805 A1 | 7/2011 | DeSimone | |
| 2011/0262672 A1 * | 10/2011 | Lavallee | C08G 69/42 |
| | | | 428/36.9 |
| 2011/0278772 A1 | 11/2011 | Inamiya | |
| 2011/0305787 A1 | 12/2011 | Ishii | |
| 2012/0099323 A1 | 4/2012 | Thompson | |
| 2012/0327507 A1 | 12/2012 | Padiyath | |
| 2013/0038928 A1 | 2/2013 | Padiyath | |
| 2013/0319522 A1 | 12/2013 | Kioke | |
| 2014/0021492 A1 | 1/2014 | Wolk | |
| 2014/0085178 A1 | 3/2014 | Kokkosoulis | |
| 2014/0175707 A1 | 6/2014 | Wolk | |
| 2014/0178646 A1 * | 6/2014 | Wolk | B32B 3/263 |
| | | | 428/161 |
| 2014/0182676 A1 | 7/2014 | Rosenberg | |
| 2014/0242343 A1 | 8/2014 | Free | |
| 2015/0079363 A1 | 3/2015 | Free | |
| 2015/0202834 A1 | 7/2015 | Free | |
| 2016/0096316 A1 | 4/2016 | Wolk | |
| 2016/0104851 A1 | 4/2016 | Wolk | |

FOREIGN PATENT DOCUMENTS

| | | |
|---|---|---|
| JP | 2003-167108 | 6/2003 |
| JP | 2003222727 | 8/2003 |
| JP | 2004-004750 | 1/2004 |
| JP | 2006113113 | 4/2006 |
| JP | 2007087649 | 4/2007 |
| JP | 2007114587 | 5/2007 |
| JP | 2007264374 | 10/2007 |
| JP | 2010085527 | 4/2010 |
| JP | 2011-094469 | 5/2011 |
| WO | WO 2008-118610 | 10/2008 |
| WO | WO 2009-121180 | 10/2009 |
| WO | WO 2011-088161 | 7/2011 |
| WO | WO 2012-077738 | 6/2012 |
| WO | WO 2012-082536 | 6/2012 |
| WO | WO 2012-134787 | 10/2012 |
| WO | WO 2013-012858 | 1/2013 |
| WO | WO 2013-012865 | 1/2013 |
| WO | WO 2013/032053 | 3/2013 |
| WO | WO 2013-078278 | 5/2013 |
| WO | WO 2014-194154 | 12/2014 |
| WO | WO 2015-069444 | 5/2015 |
| WO | WO 2015-108773 | 7/2015 |
| WO | WO 2015-112711 | 7/2015 |
| WO | WO 2016-064595 | 4/2016 |
| WO | WO 2016-099600 | 6/2016 |

OTHER PUBLICATIONS

Chiniwalla, "Multilayer Planarization of Polymer Dielectrics," IEEE Transactions on Advanced Packaging, Feb. 2001, vol. 24, No. 1, pp. 41-53.

Hocheng, "Microstructural Fabrication and Design of Sunlight Guide Panels of Inorganic-Organic Hybrid Material," Energy and Buildings, Apr. 2011, vol. 43, No. 4, pp. 1011-1019.

Klammt, "Microoptics for Efficient Redirection of Sunlight," Applied Optics, Apr. 2012, vol. 51, No. 12, pp. 2051-2056.

Klammt, "Redirection of Sunlight by Microstructured Components—Simulation, Fabrication and Experimental Results," Solar Energy, May 2012, vol. 86, No. 5, pp. 1660-1666.

Kostro, "Embedded Microstructures for Daylighting and Seasonal Thermal Control," Proc. of SPIE, Oct. 2012, vol. 8485, pp. 84850L-1-84850L-12.

Laouadi, "Optical Model for Prismatic Glazing (1415-RP)," HVAC&R Research, Jan. 2013, vol. 19, No. 1, pp. 63-75.

(56) References Cited

OTHER PUBLICATIONS

Ludman, "Holographic Daylighting," Proc. of SPIE, Jul. 1995, vol. 2532, pp. 436-446.
Mistler, Tape Casting: Theory and Practice, 37-45, (2000).
Schaefer, "Low Emissivity Coatings on Architectural Glass," Surface and Coatings Technology, Aug. 1997, vol. 93, No. 1, pp. 37-45.
Shaw, "Negative Photoresists for Optical Lithography," IBM Journal of Research and Development, Jan. 1997, vol. 41, No. 1/2, pp. 81-94.
International Search Report for PCT International Application No. PCT/US2015/012447, dated May 6, 2015, 3 pages.
U.S. Appl. No. 15/257,099, filed Sep. 6, 2016.
U.S. Appl. No. 15/270,627, filed Sep. 20, 2016.

\* cited by examiner

MICROOPTICS FOR GLAZING

CROSS REFERENCE TO RELATED APPLICATIONS

This application is a national stage filing under 35 U.S.C. 371 of PCT/US2015/012447, filed Jan. 22, 2015, which claims the benefit of U.S. Provisional Application No. 61/930161, filed Jan. 22, 2014, the disclosures of which are incorporated by reference in their entirety herein.

BACKGROUND

Insulated Glazing Units (IGUs) are used to reduce thermal loss through architectural exterior wall windows. A typical IGU includes two panes, a spacer frame, and a cavity formed by these three elements. Microoptical elements integrated into an IGU can be used to redirect some of the sunlight passing through the IGU to an interior ceiling, to augment conventional interior lighting, thereby increasing the energy efficiency of buildings. In many cases, it can be convenient to integrate the microoptical elements directly on the glass of the window, e.g., by applying refractive or diffractive optical structures to the surface of the glass. Microoptics applied to the outside surface of an IGU can be adversely impacted by several factors, including soiling and abrasion. It would be advantageous to apply microoptics to the glass surfaces within the cavity of an IGU; however, such structures must exhibit photo- and thermal-stability so that the clean environment within the IGU is maintained.

SUMMARY

The present disclosure provides lamination transfer films and use of the lamination transfer films, particular in the fabrication of architectural glass elements, such as those used in Insulated Glass Units (IGUs). The lamination transfer films may be used to transfer functional layers and structures. The lamination transfer films may include a support film that can be removed during the transfer process, and the transferred materials are primarily inorganic. The resulting transferred structures on glass generally have high photo- and thermal-stability, and therefore can successfully be applied to the glass surfaces that are interior to the cavity within an IGU. The lamination transfer films can also be patterned such that macroscopic patterns of microoptical elements can be applied on a glass surface. In one aspect, the present disclosure provides a transfer tape that includes a template layer having a structured surface; a backfill layer disposed on at least a portion of the template layer, the backfill layer having a highly branched organosilicon material having a planar surface opposite the structured surface; and a diffuser layer disposed adjacent the planar surface, wherein the diffuser layer is capable of adhering to a glass surface, and the template layer is capable of being removed from the backfill layer.

In another aspect, the present disclosure provides a transfer tape that includes a template layer having a structured surface; and a backfill layer disposed on at least a portion of the template layer, the backfill layer having a highly branched organosilicon material having a planar surface opposite the transfer layer coating, wherein the backfill layer is disposed in a pattern on the template layer.

In yet another aspect, the present disclosure provides a microoptical glazing that includes a pane of glass having a major surface; a microoptical layer bonded to at least a portion of the major surface, the microoptical layer having a cured backfill layer comprising a highly branched organosilicon material having a planar surface immediately adjacent the major surface, and an opposing structured surface, wherein the structured surface is adjacent a low index material having an index of refraction lower than the cured inorganic transfer layer.

In yet another aspect, the present disclosure provides an insulated glazing unit that includes a first pane of glass separated by a gap from a second pane of glass facing the first pane of glass, each of the first and second panes of glass having an interior surface adjacent the gap; and a microoptical layer bonded to at least a portion of the interior surface of at least one of the first and second panes of glass, the microoptical layer having a cured backfill layer including a highly branched organosilicon material having a planar surface immediately adjacent the interior surface and an opposing structured surface, wherein the structured surface is adjacent a low index material having an index of refraction lower than the cured inorganic transfer layer.

In yet another aspect, the present disclosure provides a sunlight redirecting window that includes an insulated glazing unit having a first pane of glass having an outside surface and separated by a gap from a second pane of glass having an inside surface, each of the first and second panes of glass having an interior surface adjacent the gap; and a microoptical layer bonded to at least a portion of the interior surface of the second pane of glass, the microoptical layer having a cured backfill layer including a highly branched organosilicon material having a planar surface immediately adjacent the interior surface and an opposing structured surface, wherein the structured surface is adjacent a gas filling the gap, such that sunlight passing through the outside surface is refracted by the structured surface before passing through the inside surface.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
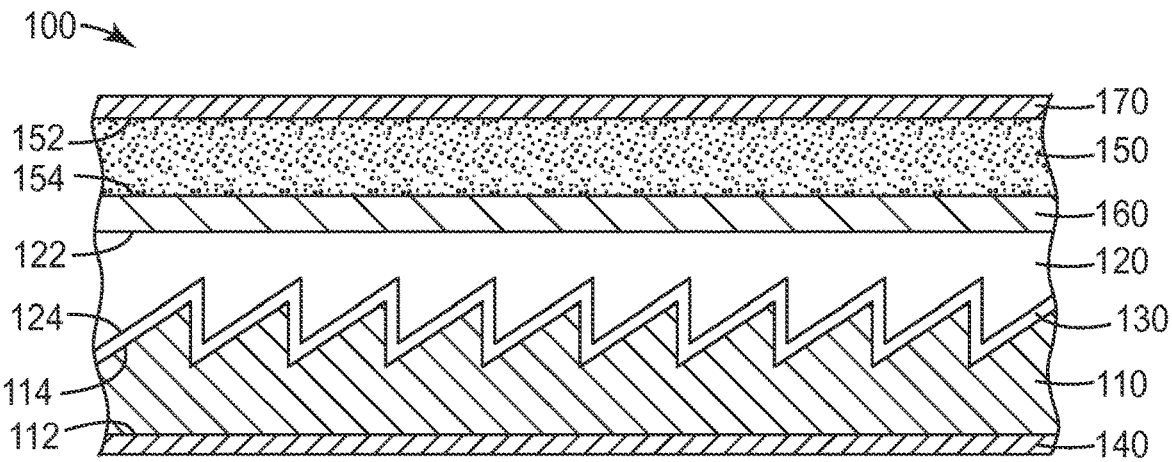
FIG. 1A shows a schematic cross-sectional view of a transfer tape.

The present disclosure provides lamination transfer films and use of the lamination transfer films, particular in the fabrication of architectural glass elements, such as those used in Insulated Glass Units (IGUs). The lamination transfer films may be used to transfer functional layers (e.g. low emissivity coatings and/or diffusing layers) and structures (e.g. microoptics for decorative applications and/or daylight redirection). The lamination transfer films may include a support film that can be removed during the transfer process, and the transferred materials are primarily inorganic. The resulting transferred structures on glass generally have high photo- and thermal-stability, and therefore can successfully be applied to the glass surfaces that are interior to the cavity within an IGU. The lamination transfer films can also be patterned such that macroscopic patterns of microoptics can be applied on a glass surface. The glass (i.e., the receptor substrate) used can be a single pane glass, a double pane glass such as in an IGU, three or more paned glass IGUs, and even vacuum IGUs. This feature enables the creation of both decorative and functional designs, including the ability to spatially modify the viewable and functional regions of the glass surface.

In the following description, reference is made to the accompanying drawings that forms a part hereof and in which are shown by way of illustration. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being "directly on," "directly connected to," "directly coupled with," or "directly in contact with" another element, there are no intervening elements, components or layers for example.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

The term "actinic radiation" refers to wavelengths of radiation that can crosslink or cure polymers and can include ultraviolet, visible, and infrared wavelengths and can include digital exposures from rastered lasers, thermal digital imaging, and electron beam scanning.

The terms "backfill materials" or "backfill layers" refers to layers of materials that fill in irregular or structured surfaces to produce a new surface that may be used as a base to build additional layered elements and is thermally stable.

The term "bake-out" refer to the process of substantially removing sacrificial material present in a layer by pyrolysis, combustion, sublimation, or vaporization while leaving thermally stable materials substantially intact (backfill, substrate).

The term "bake-out temp" refer to the maximum temperature reached during the process of substantially removing sacrificial materials in a layer by pyrolysis or combustion while leaving thermally stable materials substantially intact (backfill, substrate).

The term "combust" or "combustion" refers to a process of heating a layer that comprises organic materials in an oxidizing atmosphere so that organic materials undergo a chemical reaction with the oxidant.

The term "solvent" refers to organic or aqueous liquid that is capable of dissolving, dispersing or suspending the materials described herein, e.g., organosilicon compounds, nanoparticles, polymers, sacrificial materials, etc.

The terms "nanostructure" or "nanostructures" refers to structures having at least one dimension (e.g., height, length, width, or diameter) of less than 2 micrometers and more preferably less than one micrometer. Nanostructure includes, but is not necessarily limited to, particles and engineered features. The particles and engineered features can have, for example, a regular or irregular shape. Such particles are also referred to as nanoparticles. The term "nanostructured" refers to a material or layer having nanostructures.

The term "microstructures" refers to features that range from about 1 micron to about 2 mm in their longest dimension.

The terms "pyrolyze" or "pyrolysis" refers to a process of heating a sacrificial layer in an inert atmosphere so that organic materials in the article decompose.

The term "structured surface" refers to a surface that includes periodic, quasi-periodic or random engineered microstructures, nanostructures, and/or hierarchical structures that can be in a regular pattern or random across the surface.

The term "thermally stable" refers to materials that remain substantially intact during the removal of sacrificial materials.

The term "polysiloxanes" refers to highly branched oligomeric or polymeric organosilicon compounds and may include carbon-carbon and/or carbon-hydrogen bonds while still being considered as inorganic compounds.

The term "migratable species" refers to a molecular species that moves from the backfill layer to the sacrificial layer. For example, a migratable species might include silanes, siloxanes, polysiloxanes or other organosilicon compounds.

Lamination transfer films, patterned structured tapes, and methods of using nanostructured tapes useful in the present disclosure have been described, for example, in Applicants' pending applications, U.S. Pat. Publ. Nos. 2014/0021492, 2014/0178646; 2014/0175707; U.S. Provisional Appl. No. 61/902,437, entitled NANOSTRUCTURES FOR OLED DEVICES, filed Nov. 11, 2013; and U.S. application Ser. No. 14/159,300, entitled LAMINATION TRANSFER FILMS FOR FORMING ARTICLES WITH ENGINEERED VOIDS; Ser. No. 14/159,253, entitled LAMINATION TRANSFER FILMS FOR FORMING ANTIREFLECTIVE STRUCTURES; and 61/929,425, entitled LAMINATION TRANSFER FILMS FOR FORMING REENTRANT STRUCTURES, all filed on Jan. 20, 2014.

FIG. 1A shows a schematic cross-sectional view of a transfer tape 100, according to one aspect of the disclosure. Transfer tape 100 includes a template layer 110 having a structured surface 114 and a backfill layer 120 disposed on at least a portion of the template layer 110. In one particular embodiment, the template layer 110 is capable of being removed from the backfill layer 120. In some cases the template layer 110 may be either removable or sacrificial. The backfill layer 120 comprises a highly branched organosilicon material having a planar surface 122 opposite structured surface 114. The backfill layer 120 includes a transfer structured surface 124 disposed adjacent to, and following the contours of, the structured surface 114. In one particular embodiment, the transfer tape 100 further includes an optional diffuser layer 150 disposed adjacent the planar surface 122, and the optional diffuser layer 150 includes an outer surface 152 capable of adhering to a glass surface (not shown), as described elsewhere. The transfer tape 100 can further include an optional separation layer 160 disposed between the diffuser layer 150 and the planar surface 122, wherein the index of refraction of the optional separation layer 160 can be the same or different than the index of refraction of the backfill layer 120, the diffuser layer 150, or both.

In some cases, the transfer tape 100 can include an optional carrier film 140 disposed on a planar surface 112 of the template layer 110, opposite the structured surface 114. The optional carrier film 140 can be useful for supporting the template layer 110 during transport and subsequent fabrication steps, and in some cases can be used during the fabrication of the template layer 110, as described elsewhere. In some cases, the optional carrier film 140 can be bonded to the template layer 110 such that the two layers are not easily separated; however, in some cases, the optional carrier film 140 can be releasably attached to the template layer 110. The transfer tape 100 can still further include an optional release liner 170 disposed opposite the optional carrier film 140 and sandwiching the other layers of the transfer tape 100 therebetween.

In one particular embodiment, an optional transfer layer 130 can be disposed on and conforming to the template structured surface 114 of the template layer 110, such that the optional transfer layer 130 separates the structured surface 114 from the transfer structured surface 124. In some cases, the optional transfer layer 130 can comprise a transfer release coating. In some cases, the optional transfer layer 130 can comprise at least one inorganic layer that can be an inorganic thin film stack, such as a low emissivity coating.

Figure 1B:
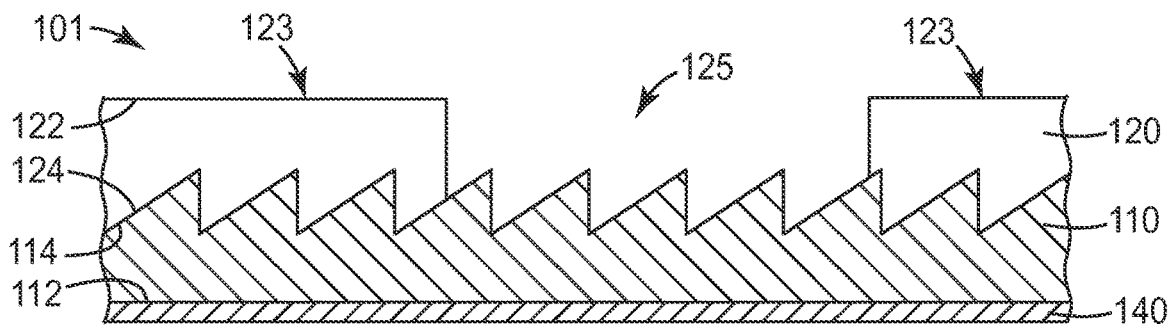
FIG. 1B shows a schematic cross-sectional view of a transfer tape.

FIG. 1B shows a schematic cross-sectional view of a transfer tape 101, according to one aspect of the disclosure. Each of the elements 110-140 shown in FIG. 1B correspond to like-numbered elements 110-140 shown in FIG. 1A, which have been described previously. For example, template layer 110 shown in FIG. 1B corresponds to template layer 110 shown in FIG. 1A, and so on. In FIG. 1B, transfer tape 101 includes a template layer 110 having a structured surface 114 and a backfill layer 120 including a transfer structured surface 124 disposed adjacent to, and following the contours of, the structured surface 114. The backfill layer 120 is disposed in a pattern on the template layer 110, such that a first portion 123 of the transfer tape 101 having a backfill layer 120 is positioned adjacent to a second portion 125 that lacks a backfill layer 120. It is to be understood that each of the additional layers (130, 150, 160, 170) described with reference to FIG. 1A can also be positioned in a like manner adjacent the backfill layer 120, but are not shown in FIG. 1B for clarity. The pattern formed by the first and second portions 123, 125, of the transfer tape 101 can comprise a plurality of islands, lines, or a combination of islands and lines that extend over the surface of the transfer tape 101, and can further comprise a gradient in areal density from one end of the transfer tape 101 to an opposing end, as shown elsewhere.

Figure 1C:
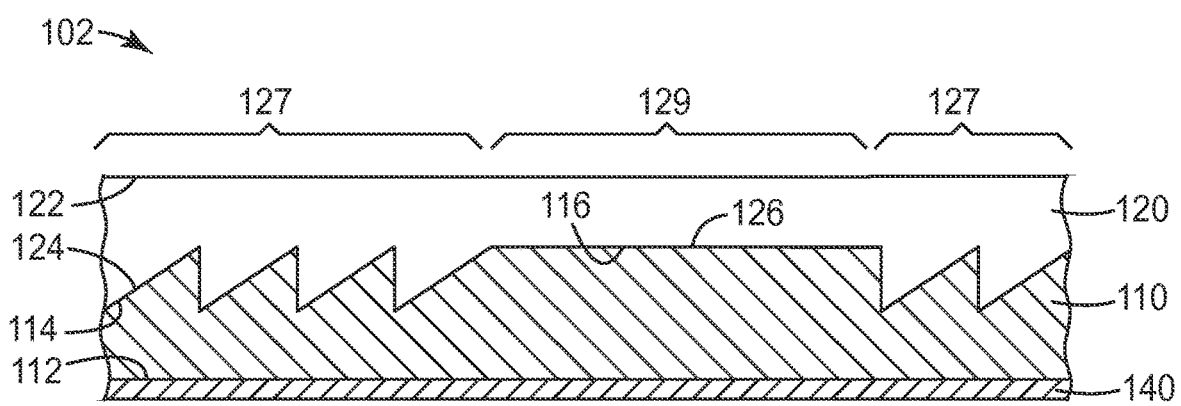
FIG. 1C shows a schematic cross-sectional view of a transfer tape.

FIG. 1C shows a schematic cross-sectional view of a transfer tape 102, according to one aspect of the disclosure. Each of the elements 110-140 shown in FIG. 1C correspond to like-numbered elements 110-140 shown in FIG. 1A, which have been described previously. For example, template layer 110 shown in FIG. 1C corresponds to template layer 110 shown in FIG. 1A, and so on. In FIG. 1C, transfer tape 102 includes a template layer 110 having a structured surface 114 including planar regions 116, and a backfill layer 120 including a transfer structured surface 124 including transfer planar regions 126 disposed adjacent to, and following the contours of, the structured surface 114 with planar regions 116 of template layer 110, respectively. The transfer tape 102 includes a first portion 127 having structured surface 114, 124, and an adjacent second portions 129 having planar regions 116, 126, that are disposed in a pattern. It is to be understood that each of the additional layers (130, 150, 160, 170) described with reference to FIG. 1A can also be positioned in a like manner adjacent the backfill layer 120, but are not shown in FIG. 1C for clarity. The pattern formed by the first and second portions 127, 129, of the transfer tape 102 can comprise a plurality of islands, lines, or a combination of islands and lines that extend over the surface of the transfer tape 102, and can further comprise a gradient in areal density from one end of the transfer tape 102 to an opposing end, as shown elsewhere.

Carrier Film

The optional carrier film 140 can be any suitable film, including, for example, thermally stable flexible films that can provide mechanical support for the other layers. The optional carrier film 140 may be thermally stable above 50°

C., or alternatively 70° C., or alternatively above 120° C. One example of an optional carrier film 140 is polyethylene terephthalate (PET). In some embodiments, the optional carrier film 140 can include paper, release-coated paper, non-wovens, wovens (fabric), metal films, and metal foils.

Various polymeric film substrates comprised of various thermosetting or thermoplastic polymers are suitable for use as the optional carrier film 140. The support may be a single layer or multi-layer film. Illustrative examples of polymers that may be employed as the optional carrier film include (1) fluorinated polymers such as poly(chlorotrifluoroethylene), poly(tetrafluoroethylene-cohexafluoropropylene), poly(tetrafluoroethylene-co-perfluoro(alkyl)vinylether), poly(vinylidene fluoride-cohexafluoropropylene); (2) ionomeric ethylene copolymers poly(ethylene-co-methacrylic acid) with sodium or zinc ions such as SURLYN-8920 Brand and SURLYN-9910 Brand available from E. I. duPont Nemours, Wilmington, Del.; (3) low density polyethylenes such as low density polyethylene; linear low density polyethylene; and very low density polyethylene; plasticized vinyl halide polymers such as plasticized poly(vinylchloride); (4) polyethylene copolymers including acid functional polymers such as poly(ethylene-co-acrylic acid) "EAA", poly(ethylene-co-methacrylic acid) "EMA", poly(ethylene-co-maleic acid), and poly(ethylene-co-fumaric acid); acrylic functional polymers such as poly(ethylene-co-alkylacrylates) where the alkyl group is methyl, ethyl, propyl, butyl, et cetera, or CH3(CH2)n- where n is 0 to 12, and poly(ethylene-co-vinylacetate) "EVA"; and (5) (e.g.) aliphatic polyurethanes. The optional carrier film can be an olefinic polymeric material, typically comprising at least 50 wt-% of an alkylene having 2 to 8 carbon atoms with ethylene and propylene being most commonly employed. Other body layers include for example poly(ethylene naphthalate), polycarbonate, poly(meth)acrylate (e.g., polymethyl methacrylate or "PMMA"), polyolefins (e.g., polypropylene or "PP"), polyesters (e.g., polyethylene terephthalate or "PET"), polyamides, polyimides, phenolic resins, cellulose diacetate, cellulose triacetate (TAC), polystyrene, styrene-acrylonitrile copolymers, cyclic olefin copolymers, epoxies, and the like. In some embodiments, the optional carrier film can include paper, release-coated paper, non-wovens, wovens (fabric), metal films, and metal foils.

In some embodiments, the optional carrier film can include sacrificial materials. Sacrificial materials, typically sacrificial layers, can be pyrolyzed by subjecting them to thermal conditions that can vaporize substantially all of the organic material present in the sacrificial layers. Sacrificial layers can also be subjected to combustion to burn out all of the organic material present in the sacrificial layer. Typically, a clear, high-purity polymer, such as poly(methyl methacrylate), poly(ethyl acrylate-co-methyl methacrylate), can be used as the sacrificial material. Useful sacrificial materials leave very low organic residuals (ash) after pyrolysis or combustion at the bake-out temperature.

In some embodiments, the optional carrier film of a disclosed transfer film can be coated with a releasable material on one surface. After making the rest of the transfer film and laminating the transfer film to a receptor substrate to form a laminate, the optional carrier film can be removed from the laminate by peeling it away from the surface which it is supporting in the transfer film. In this embodiment, the optional carrier film need not be pyrolyzed or combusted to be removed and can include any of the materials described above as optional carrier film materials. In one particular embodiment, a photomask can be incorporated with the optional carrier film, to facilitate patterning of the transferred layer, as described elsewhere.

Release Layers

Reduction of the adhesion to any layer applied to it can be accomplished by application of a release layer or coating, and as such a release coating can be applied to any of the layers in the transfer film to facilitate release and can be used, for example, in a release liner. One method of applying a release coating to the surface of the support carrier film is with plasma deposition. An oligomer can be used to create a plasma cross-linked release coating. The oligomer may be in liquid or in solid form prior to coating. Typically the oligomer has a molecular weight greater than 1000. Also, the oligomer typically has a molecular weight less than 10,000 so that the oligomer is not too volatile. An oligomer with a molecular weight greater than 10,000 typically may be too non-volatile, causing droplets to form during coating. In one embodiment, the oligomer has a molecular weight greater than 3000 and less than 7000. In another embodiment, the oligomer has a molecular weight greater than 3500 and less than 5500. Typically, the oligomer has the properties of providing a low-friction surface coating. Suitable oligomers include silicone-containing hydrocarbons, reactive silicone containing trialkoxysilanes, aromatic and aliphatic hydrocarbons, fluorochemicals and combinations thereof. For example, suitable resins include, but are not limited to, dimethylsilicone, hydrocarbon based polyether, fluorochemical polyether, ethylene tetrafluoroethylene, and fluorosilicones. Fluorosilane surface chemistry, vacuum deposition, and surface fluorination may also be used to provide a release coating.

Plasma polymerized thin films constitute a separate class of material from conventional polymers that can be used as release layers or coatings. In plasma polymers, the polymerization is random, the degree of cross-linking is extremely high, and the resulting polymer film is very different from the corresponding "conventional" polymer film. Thus, plasma polymers are considered by those skilled in the art to be a uniquely different class of materials and are useful in the disclosed articles. In addition, there are other ways to apply release coatings to the template layer, including, but not limited to, blooming, coating, coextrusion, spray coating, electrocoating, or dip coating.

The release coating or layer may be a fluorine-containing material, a silicon-containing material, a fluoropolymer, a silicone polymer, or a poly(meth)acrylate ester derived from a monomer comprising an alkyl (meth)acrylate having an alkyl group with 12 to 30 carbon atoms. In one embodiment, the alkyl group can be branched. Illustrative examples of useful fluoropolymers and silicone polymers can be found in U.S. Pat. No. 4,472,480 (Olson), U.S. Pat. Nos. 4,567,073 and 4,614,667 (both Larson et al.). Illustrative examples of a useful poly(meth)acrylate ester can be found in U. S. Pat. Appl. Publ. No. 2005/118352 (Suwa). The removal of the liner shouldn't negatively alter the surface topology of the transfer layer.

The template layer 110 typically can be removed from the underlying cured layer, such as the backfill layer 120, to result in the final microoptical glazing, as described elsewhere. One method to reduce the adhesion of the backfill layer 120 to the template layer 110 is to apply an optional transfer layer 130 that can be a release coating as described above.

Template Layer

The structured surface 114 can be one-dimensional (1D), meaning the structures are periodic in only one dimension, that is, nearest-neighbor features are spaced equally in one direction along the surface, but not along the orthogonal direction. One-dimensional structures include, for example, continuous or elongated prisms or ridges, linear gratings, cylindrical or curved lens-shaped features, and random structures including chaos structures, and the like.

The structures can also be two-dimensional (2D), meaning they are periodic in two dimensions, that is, nearest neighbor features are spaced equally in two different directions along the surface. In the case of 2D structures, the spacing in both directions may be different. Two-dimensional structures include, for example, diffractive optical structures, pyramids, trapezoids, round or square shaped posts, photonic crystal structures, spherical or curved lenses, curved sided cone structures, and the like.

The structured surface 114 can generally include surface features that are any desirable height, for example heights suitable for microoptical refractive surfaces, and may range from a few nanometers to several microns in height, such as greater than about 1 micron, or greater than about 5 microns, or greater than about 10 microns, or greater than about 20 microns, or greater than about 50 microns, or greater than about 100 microns, or even about 2000 microns or more in height. The microoptical refractive surfaces may be useful for decorative, functional, or a combination of decorative and functional redistribution of light through a material, such as used in architectural glazing.

Removable Template

The template layer 110 can be formed through embossing, replication processes, extrusion, casting, or surface structuring, for example. It is to be understood that the template layer 110 can have a structured surface 114 that may include nanostructures, microstructures, or hierarchical structures. In some embodiments, the template layer 110 can be compatible with patterning, actinic patterning, embossing, extruding, and coextruding.

Typically, the template layer 110 includes a photocurable material that can have a low viscosity during the replication process and then can be quickly cured to form a permanent crosslinked polymeric network "locking in" the replicated nanostructures, microstructures or hierarchical structures. Any photocurable resins known to those of ordinary skill in the art of photopolymerization can be used for the template layer 110. The resin used for the template layer 110 may be capable, when crosslinked, of releasing from the backfill layer 120 during the use of the disclosed transfer tapes, or should be compatible with application of a release layer and the process for applying the release layer.

Polymers that can be used as the template layer 110 also include the following: styrene acrylonitrile copolymers; styrene(meth)acrylate copolymers; polymethylmethacrylate; polycarbonate; styrene maleic anhydride copolymers; nucleated semi-crystalline polyesters; copolymers of polyethylenenaphthalate; polyimides; polyimide copolymers; polyetherimide; polystyrenes; syndiodactic polystyrene; polyphenylene oxides; cyclic olefin polymers; and copolymers of acrylonitrile, butadiene, and styrene. One preferable polymer is the Lustran SAN Sparkle material available from Ineos ABS (USA) Corporation. Polymers for radiation cured template layers 110 include cross linked acrylates such as multifunctional acrylates or epoxies and acrylated urethanes blended with mono- and multifunctional monomers.

Patterned structured template layers can be formed by depositing a layer of a radiation curable composition onto one surface of a radiation transmissive support to provide a layer having an exposed surface, contacting a master with a preformed surface bearing a pattern capable of imparting a three-dimensional microstructure of precisely shaped and located interactive functional discontinuities including distal surface portions and adjacent depressed surface portions into the exposed surface of the layer of radiation curable composition on said support under sufficient contact pressure to impart said pattern into said layer, exposing said curable composition to a sufficient level of radiation through the carrier to cure said composition while the layer of radiation curable composition is in contact with the patterned surface of the master. This cast and cure process can be done in a continuous manner using a roll of support, depositing a layer of curable material onto the support, laminating the curable material against a master and curing the curable material using actinic radiation. The resulting roll of support with a patterned, structured template disposed thereon can then be rolled up. This method is disclosed, for example, in U.S. Pat. No. 6,858,253 (Williams et al.).

For extrusion or embossed template layers, the materials making up the template layer can be selected depending on the particular topography of the top structured surface that is to be imparted. In general, the materials are selected such that the structure is fully replicated before the materials solidify. This will depend in part on the temperature at which the material is held during the extrusion process and the temperature of the tool used to impart the top structured surface, as well as on the speed at which extrusion is being carried out. Typically, the extrudable polymer used in the top layer has a $T_g$ of less than about 140° C., or a $T_g$ of from about 85° C. to about 120° C., in order to be amenable to extrusion replication and embossing under most operating conditions. In some embodiments, the optional carrier film and the template layer can be coextruded at the same time. This embodiment requires at least two layers of coextrusion: a top layer with one polymer and a bottom layer with another polymer. If the top layer comprises a first extrudable polymer, then the first extrudable polymer can have a $T_g$ of less than about 140° C. or a $T_g$ or of from about 85° C. to about 120° C. If the top layer comprises a second extrudable polymer, then the second extrudable polymer, which can function as the optional carrier film, has a $T_g$ of less than about 140° C. or a $T_g$ of from about 85° C. to about 120° C. Other properties such as molecular weight and melt viscosity should also be considered and will depend upon the particular polymer or polymers used. The materials used in the template layer should also be selected so that they provide good adhesion to the optional carrier film so that delamination of the two layers is minimized during the lifetime of the article.

The extruded or coextruded template layer can be cast onto a master roll that can impart patterned structure to the template layer. This can be done batch-wise or in a continuous roll-to-roll process. Additionally, a nanostructured transfer layer can be extruded onto the extruded or coextruded template layer. In some embodiments, both layers: optional carrier film and template layers can be coextruded at once.

Useful polymers that may be used as the template layer polymer include one or more polymers selected from the group consisting of styrene acrylonitrile copolymers; styrene (meth)acrylate copolymers; polymethylmethacrylate; styrene maleic anhydride copolymers; nucleated semi-crystalline polyesters; copolymers of polyethylenenaphthalate; polyimides; polyimide copolymers; polyetherimide; polystyrenes; syndiodactic polystyrene; polyphenylene oxides; and copolymers of acrylonitrile, butadiene, and styrene. Particularly useful polymers that may be used as the first extrudable polymer include styrene acrylonitrile copolymers known as TYRIL copolymers available from Dow Chemical; examples include TYRIL 880 and 125. Other particularly useful polymers that may be used as the template polymer include styrene maleic anhydride copolymer DYLARK 332 and styrene acrylate copolymer NAS 30, both from Nova Chemical. Also useful are polyethylene terephthalate blended with nucleating agents such as magnesium silicate, sodium acetate, or methylenebis(2,4-di-t-butylphenol) acid sodium phosphate.

Additional useful polymers include CoPENs (copolymers of polyethylenenaphthalate), CoPVN (copolymers of polyvinylnaphthalene) and polyimides including polyetherimide. Suitable resin compositions include transparent materials that are dimensionally stable, durable, weatherable, and readily formable into the desired configuration. Examples of suitable materials include acrylics, which have an index of refraction of about 1.5, such as PLEXIGLAS brand resin manufactured by Rohm and Haas Company; polycarbonates, which have an index of refraction of about 1.59; reactive materials such as thermoset acrylates and epoxy acrylates; polyethylene based ionomers, such as those marketed under the brand name of SURLYN by E. I. Dupont de Nemours and Co., Inc.; (poly)ethylene-co-acrylic acid; polyesters; polyurethanes; and cellulose acetate butyrates. The template layer may be prepared by casting directly onto an optional carrier film, such as disclosed in U.S. Pat. No. 5,691,846 (Benson). Polymers for radiation cured structures include cross linked acrylates such as multifunctional acrylates or epoxies and acrylated urethanes blended with mono- and multifunctional monomers.

Sacrificial Template

A sacrificial layer is a material capable of being baked out or otherwise removed. The sacrificial layer includes, for example, the sacrificial template layer and the optional sacrificial releasable layer, depending upon a construction of the transfer film. The structured surface of the sacrificial layer can be formed through embossing, a replication process, extrusion, casting, or surface structuring, for example. The structured surface can include nanostructures, microstructures, or hierarchical structures. Nanostructures comprise features having at least one dimension (e.g., height, width, or length) less than or equal to two microns. Microstructures comprise features having at least one dimension (e.g., height, width, or length) less than or equal to two millimeters. Hierarchical structures are combinations of nanostructures and microstructures.

The sacrificial layer (e.g., 412, 512, shown and described in FIGS. 4 and 5, respectively) can comprise any material as long as the desired properties are obtained. Preferably, the sacrificial layer is made from a polymerizable composition comprising polymers having number average molecular weights of about 1,000 Da or less (e.g., monomers and oligomers). Particularly suitable monomers or oligomers have molecular weights of about 500 Da or less, and even more particularly suitable polymerizable molecules have molecular weights of about 200 Da or less. Said polymerizable compositions are typically cured using actinic radiation, e.g., visible light, ultraviolet radiation, electron beam radiation, heat and combinations thereof, or any of a variety of conventional anionic, cationic, free radical or other polymerization techniques, which can be photochemically or thermally initiated.

Useful polymerizable compositions comprise curable functional groups known in the art, such as epoxide groups, allyloxy groups, (meth)acrylate groups, epoxide, vinyl, hydroxyl, acetoxy, carboxylic acid, amino, phenolic, aldehyde, cinnamate, alkene, alkyne, ethylenically unsaturated groups, vinyl ether groups, and any derivatives and any chemically compatible combinations thereof.

The polymerizable composition used to prepare the sacrificial template layer may be monofunctional or multifunctional (e.g., di-, tri-, and tetra-) in terms of radiation curable moieties. Examples of suitable monofunctional polymerizable precursors include styrene, alpha-methylstyrene, substituted styrene, vinyl esters, vinyl ethers, octyl (meth) acrylate, nonylphenol ethoxylate (meth)acrylate, isobornyl (meth)acrylate, isononyl (meth)acrylate, 2-(2-ethoxyethoxy) ethyl (meth)acrylate, 2-ethylhexyl (meth)acrylate, lauryl (meth)acrylate, beta-carboxyethyl (meth)acrylate, isobutyl (meth)acrylate, cycloaliphatic epoxide, alpha-epoxide, 2-hydroxyethyl (meth)acrylate, isodecyl (meth)acrylate, dodecyl (meth)acrylate, n-butyl (meth)acrylate, methyl (meth)acrylate, hexyl (meth)acrylate, (meth)acrylic acid, N-vinylcaprolactam, stearyl (meth)acrylate, hydroxyl functional caprolactone ester (meth)acrylate, isooctyl (meth)acrylate, hydroxyethyl (meth)acrylate, hydroxypropyl (meth)acrylate, hydroxyisopropyl (meth)acrylate, hydroxybutyl (meth) acrylate, hydroxyisobutyl (meth)acrylate, tetrahydrofuryl (meth)acrylate, and any combinations thereof.

Examples of suitable multifunctional polymerizable precursors include ethyl glycol di(meth)acrylate, hexanediol di(meth)acrylate, triethylene glycol di(meth)acrylate, tetraethylene glycol di(meth)acrylate, trimethylolpropane tri (meth)acrylate, trimethylolpropanepropane tri(meth)acrylate, glycerol tri(meth)acrylate, pentaerythritol tri(meth) acrylate, pentaerythritol tetra(meth)acrylate, neopentyl glycol di(meth)acrylate, bisphenol A di(meth)acrylate, poly (1,4-butanediol) di(meth)acrylate, any substituted, ethoxylated or propoxylated versions of the materials listed above, or any combinations thereof.

The polymerization reactions generally lead to the formation of a three-dimensional "crosslinked" macromolecular network and are also known in the art as negative-tone photoresists, as reviewed by Shaw et al., "Negative photoresists for optical lithography," IBM Journal of Research and Development (1997) 41, 81-94. The formation of the network may occur through either covalent, ionic, or hydrogen bonding, or through physical crosslinking mechanisms such as chain entanglement. The reactions can also be initiated through one or more intermediate species, such as free-radical generating photoinitiators, photosensitizers, photoacid generators, photobase generators, or thermal acid generators. The type of curing agent used depends on the polymerizable precursor used and on the wavelength of the radiation used to cure the polymerizable precursor. Examples of suitable commercially available free-radical generating photoinitiators include benzophenone, benzoin ether, and acylphosphine photoinitiators, such as those sold under the trade designations "IRGACURE" and "DAROCUR" from Ciba Specialty Chemicals, Tarrytown, N.Y. Other exemplary photoinitiators include 2,2-dimethoxy-2-phenylacetophenone (DMPAP), 2,2-dimethoxyacetophenone (DMAP), xanthone, and thioxanthone.

Co-initiators and amine synergists may also be included to improve curing rates. Suitable concentrations of the curing agent in the crosslinking matrix range from about 1 wt. % to about 10 wt. %, with particularly suitable concentrations ranging from about 1 wt. % to about 5 wt. %, based on the entire weight of the polymerizable precursor. The polymerizable precursor may also include optional additives, such as heat stabilizers, ultraviolet light stabilizers, free-radical scavengers, and combinations thereof. Examples of suitable commercially available ultraviolet light stabilizers include benzophenone-type ultraviolet absorbers, which are available under the trade designation "UVINOL 400" from BASF Corp., Parsippany, N.J.; under the trade designation "CYASORB UV-1164" from Cytec Industries, West Patterson, N.J.; and under the trade designations "TINUVIN 900," "TINUVIN 123" and "TINUVIN 1130" from Ciba Specialty chemicals, Tarrytown, N.Y. Examples of suitable concentrations of ultraviolet light stabilizers in the polymerizable precursor range from about 0.1 wt. % to about 10 wt. %, with particularly suitable total concentrations ranging from about 1 wt. % to about 5 wt. %, relative to the entire weight of the polymerizable precursor.

Examples of suitable free-radical scavengers include hindered amine light stabilizer (HALS) compounds, hydroxylamines, sterically hindered phenols, and combinations thereof. Examples of suitable commercially available HALS compounds include the trade designated "TINUVIN 292" from Ciba Specialty Chemicals, Tarrytown, N.Y., and the trade designated "CYASORB UV-24" from Cytec Industries, West Patterson, N.J. Examples of suitable concentrations of free radical scavengers in the polymerizable precursor range from about 0.05 wt. % to about 0.25 wt. %.

Patterned structured template layers can be formed by depositing a layer of a radiation curable composition onto one surface of a radiation transmissive carrier to provide a layer having an exposed surface, contacting a master with a preformed surface bearing a pattern capable of imparting a three-dimensional structure of precisely shaped and located interactive functional discontinuities including distal surface portions and adjacent depressed surface portions into the exposed surface of the layer of radiation curable composition on said carrier under sufficient contact pressure to impart said pattern into said layer, exposing said curable composition to a sufficient level of radiation through the carrier to cure said composition while the layer of radiation curable composition is in contact with the patterned surface of the master. This cast and cure process can be done in a continuous manner using a roll of carrier, depositing a layer of curable material onto the carrier, laminating the curable material against a master and curing the curable material using actinic radiation. The resulting roll of carrier with a patterned, structured template disposed thereon can then be rolled up. This method is disclosed, for example, in U.S. Pat. No. 6,858,253 (Williams et al.).

Other materials that may be used for the sacrificial layer include, polyvinyl alcohol (PVA), ethylcellulose, methylcellulose, polynorbornenes, poly(methylmethacrylate (PMMA), poly(vinylbutyral), poly(cyclohexene carbonate), poly(cyclohexene propylene) carbonate, poly(ethylene carbonate), poly(propylene carbonate) and other aliphatic polycarbonates, and any copolymer or blends thereof, and other materials described in chapter 2, section 2.4 "Binders" of R. E. Mistler, E. R. Twiname, Tape Casting: Theory and Practice, American Ceramic Society, 2000. There are many commercial sources for these materials. These materials are typically easy to remove via dissolution or thermal decomposition via pyrolysis or combustion. Thermal heating is typically part of many manufacturing processes and thus removal of the sacrificial material may be accomplished during an existing heating step. For this reason, thermal decomposition via pyrolysis or combustion is a more preferred method of removal.

There are several properties that are preferred in the sacrificial materials. The material should be capable of being coated onto a carrier film via extrusion, knife coating, solvent coating, cast and cure, or other typical coating methods. It is preferred that the material be a solid at room temperature. For thermoplastic sacrificial materials, it is preferred that the glass transition temperature (Tg) is low enough to allow it to be embossed by a heated tool. Thus, it is preferred that the sacrificial material have a Tg above 25° C., more preferred above 40° C. and most preferred above 90° C.

Another material property that is desired for the sacrificial material is that its decomposition temperature be above the curing temperature of the backfill material(s). Once the backfill material is cured, the structured layer is permanently formed and the sacrificial template layer can be removed via any one of the methods listed above. Materials that thermally decompose with low ash or low total residue are preferred over those that have higher residuals. Residue left behind on a carrier film may adversely impact electrical and/or optical properties such as the conductivity, transparency or color of the final product. Since it is desirable to minimize any changes to these properties in the final product, residual levels of less than 1000 ppm are preferred. Residuals levels of less than 500 ppm are more preferred and residual level below 50 ppm are most preferred.

The term "cleanly baked out" means that the sacrificial layer can be removed by pyrolysis or combustion without leaving a substantial amount of residual material such as ash. Examples of preferred residual levels are provided above, although different residual levels can be used depending upon a particular application.

Sacrificial Template with Inorganic Materials

In some embodiments, at least one of the sacrificial layers comprises inorganic materials and sacrificial materials. Inorganic materials may comprise nanoparticles, surface modified nanoparticles, nanomaterials, surface modified microparticles and the like. At least one of the sacrificial layers comprising inorganic nanomaterials can be densified. Densification can include any process that can produce a densified layer of nanomaterials having a high volume fraction of nanomaterials resulting from the pyrolysis or combustion of polymers containing inorganic materials such as nanoparticles. The densified layer of nanomaterials may comprise nanoparticles, partially-fused nanoparticles, chemically sintered nanoparticles, a fused glass-like material resulting from a sintering process, or a frit. It may further include residual non-particulate organic or inorganic materials that act as a sintering agent or binder.

Surface modified particles can be incorporated into the sacrificial template resin by various methods. Surface modified particles can comprise inorganic nanomaterials, which can be selected to impart various optical properties (i.e. refractive index, birefringence), electrical properties (e.g. conductivity), mechanical properties (e.g. toughness, pencil hardness, scratch resistance) or a combination of these properties to the article. The size of the particles may be chosen to avoid significant visible light scattering in the final article. It may be desirable to use a mix of inorganic nanomaterial types to optimize an optical or material property and to lower total composition cost.

Surface modification may include a solvent exchange procedure whereby the resin is added to the surface modified sol, followed by removal of the water and co-solvent (if used) via evaporation, thus leaving the particles dispersed in the sacrificial template resin. The evaporation step can be accomplished for example, via distillation, rotary evaporation, or oven drying. In another aspect, the surface modified particles can be extracted into a water immiscible solvent followed by solvent exchange, if so desired. Alternatively, another method for incorporating the surface modified nanoparticles in the polymerizable resin involves the drying of the modified particles into a powder, followed by the addition of the resin material into which the particles are dispersed. The drying step in this method can be accomplished by conventional means suitable for the system, such as, for example, oven drying or spray drying.

Metal oxide precursors may be used in order to act as an amorphous "binder" for the inorganic nanoparticles, or they may be used alone. Suitable concentrations of the metal oxide precursors relative to the inorganic nanoparticle may range from 0.1 to 99.9 wt % of the total solids of the sacrificial template/nanomaterial system. Preferably, between 1 and 25% wt % of the system is composed of metal oxide precursor material. Sol-gel techniques may be used to react these precursors in order to cure the material into a solid mass and are known to those skilled in the art. The hydrolysis and condensation steps of the sol-gel reaction may be performed before addition of the metal oxide precursor into the sacrificial resin composition, or they may be performed after incorporation into the sacrificial resin composition at ambient temperature. Additional hydrolysis and condensation steps may also occur after mixing into the sacrificial resin composition (sacrificial material) during the bake-out cycle of the sacrificial template. In other words, as the sacrificial resin is removed, the metal-oxide precursor may be undergoing hydrolysis and condensation mechanisms. Suitable metal oxide precursors include alkyl titanates such as titanium (IV) butoxide, n-propyl titanate, titanium triethanolamine, titanium phosphate glycol, 2-ethylhexyl titanate, titanium (IV) ethoxide, titanium (IV) isopropoxide, and the like. These are commercially available under the "TYZOR" trade name owned by Dorf-Ketal Inc. (Houston, Tex.). Also suitable metal oxide precursors include zirconium chloride or zirconium(IV) alkoxides such as zirconium (IV) acrylate, zirconium(IV) tetraisopropoxide, zirconium(IV) tetraethoxide, zirconium(IV) tetrabutoxide, and the like, all available from Aldrich (St. Louis, Mo.). Also suitable metal oxide precursors include hafnium(IV) chloride or hafnium alkoxides such as hafnium(IV) carboxyethyl acrylate, hafnium(IV) tetraisopropoxide, hafnium(IV) tert-butoxide, hafnium(IV) n-butoxide, also available from Aldrich (St. Louis, Mo.).

In some embodiments, the transfer film can include polymeric materials that decompose at two different temperatures. For example, the backfill layer can include an inorganic particle-containing backfill material having a high decomposition temperature. The backfill material having a high decomposition temperature can be a polymeric material that can be thermally stable at temperatures at which another polymeric component of the laminate article (e.g. the sacrificial support film or the sacrificial template layer) is thermally unstable. Typically, organic backfill materials having a high decomposition temperature can be acrylate polymers that contain thermally stable organic pendant groups. Highly branched pendent groups containing adamantane, norbornane, or other multicyclic bridged organic pendent groups are useful for in template materials having a high decomposition temperature. For example, "ADAMANTATE" acrylates, available from Idemitsu Kosan Co., Ltd, Beijing, CHINA, can be used to make acrylic polymers with adamantane pendent groups. Adamantane-containing monomers or norbornane-containing monomers with various functional groups are also available which can allow for use of other adamantane-containing systems. Additional polymers that have a high decomposition temperature can include polyamides, polyimides, poly(ether ether ketones), polyetherimide (ULTE), polyphenyls, polybenzimidazoles, poly(benzoxazoles), polybisthiazoles, poly(quinoxalines), poly(benzoxazines) and the like.

Template Layers that Form Engineered Voids

The present disclosure further relates to lamination transfer films for forming articles with engineered voids and method of forming these lamination transfer films. These transfer films can be laminated to a desired substrate (like glass) and "baked out" to reveal a unique bridged nanostructure defining "engineered voids". The bridge element of these bridged nanostructures can be formed, for example, by migration of a molecular species from a backfill layer to a sacrificial layer. Control over migration of the molecular species (e.g., low molecular weight polysiloxanes) into the sacrificial resin can be altered by changing the chemical and physical properties of the sacrificial template and/or the molecular species (e.g., polysiloxane formulation). A high level of migration of the migratable species into the sacrificial polymer leads to the formation of the unique "bridge" structure following "bake out" of the transfer tape on the desired substrate. Alternatively, the migratable molecular species forming the bridge feature can be placed in the transfer film without the need for migration. The kinetics of siloxane curing and thermal decomposition of the microstructured sacrificial polymer both influence the morphology of the bridge. The bridge forms independently of the inorganic nanostructure that is defined by the sacrificial template layer, as the organic polymer decomposes. The space in between the bridge and the engineered nanostructure forms "engineered voids" whose shapes are defined by the bounds of the engineered nanostructure and the bridge. In some embodiments, the distribution of the migrated species in the sacrificial polymer layer determines the morphology of the final structure. Control of various aspects of bridge formation has also been demonstrated herein. The articles and process described herein may lead to numerous applications in the field of engineered ceramics. For example, some nanostructured surfaces suffer from poor durability, such as, for example, anti-reflective surfaces. The durability of nanostructured coatings can be improved by covering them with a thin inorganic mechanical barrier coating, such as the bridge structures described herein. Also, the refractive index of both the bridge and the nanostructured coating may be independently changed, leading to applications in light management. The voids can be continuous or discontinuous across the entire sample area.

The optional sacrificial carrier film and sacrificial template layer may comprise both thermally stable materials and sacrificial materials. Thermally stable materials may comprise thermally stable polymers that have a decomposition temperature substantially higher than that of the polymer used for the sacrificial template, such that the other components remain substantially intact after the bake-out of the sacrificial material used for the sacrificial template. Chemical groups containing but not limited to aromatic or alicyclic moieties, such as adamantane, norbornane, or other bridged multicyclics are useful for thermally stable polymers. These thermally stable polymers may or may not be crosslinked into the resin of the sacrificial template. One example of a thermally stable polymer that may crosslink into the network of the sacrificial template resin includes polymers sold under the trade name "ADAMANTATE", available from Idemitsu Kosan Co., Ltd, Beijing, CHINA. ADAMANTATE polymers are sold with various functionalities, such as acrylate, methacrylate and epoxy, which can be used to chemically crosslink into a suitable sacrificial resin system. Other polymers that have a high decomposition temperature and may also be chemically functionalized to be compatible within a sacrificial template system can include but are not limited to poly(amide)s, poly(imide)s, poly(ether ether ketones), poly(etherimide) (available under the trade name "ULTEM," available from SABIC Innovative Plastics, Pittsfield, Mass.), poly(phenyl)s, poly(benzimidazole)s, poly(benzoxazoles), poly(bisthiazole)s, poly(quinoxalines), poly(benzoxazines) and the like. Various molecular weights of said thermally stable polymers may be chosen in order to modify their solubility in the sacrificial template resin system, from less than 200 (oligomers) to greater than 100,000 (polymer). Preferably, a molecular weight range of 500 to 10,000 may be used.

In certain embodiments, swelling occurs in the polymer in the presence of certain solvents. The solvent laden polymer can allow for uptake of the thermally stable molecular species, but may also inhibit uptake of the thermally stable molecular species depending on the materials involved. The solvent may also change the distribution of the thermally stable molecular species in the polymer, which will affect the final size, shape or morphology of the bridge.

Optional Transfer Layer

Other coatings and layers can be applied as known in the art, including, for example anti-fouling coatings, anti-smudge coatings, anti-fog coatings, anti-reflective coatings, pigment coatings, dye coatings, and the like, and even multilayer thin-film stacks such as inorganic multilayers useful as low-e coatings such as those described in, for example, C. Schaefer, et al., "Low emissivity coatings on architectural glass", Surface and Coatings Technology 93, 1997, 37.

Backfill Layer—High Temperature Cure

The material of the backfill layer 120 typically can meet several requirements. First, it can conform to the structured surface 114 of the template layer 110 onto which it is coated. This means that the viscosity of the coating solution should be low enough to be able to flow into very small features without the entrapment of air bubbles, which will lead to good fidelity of the replicated structure. If it is solvent based, it should be coated from a solvent that does not dissolve the underlying template layer 110, which would cause cracking, or other detrimental defects of the backfill layer 120. It is desirable that the solvent has a boiling point below that of the template layer 110 glass transition temperature. Preferably, isopropanol, butyl alcohol and other alcoholic solvents have been used. Second, the material should cure with sufficient mechanical integrity (e.g., "green strength"). If the material of the backfill layer 120 does not have enough green strength after curing, the transfer structured surface 124 features of the backfill layer 120 can slump and the replication fidelity can degrade. Third, for some embodiments, the refractive index of the cured material should be tailored to produce the proper optical effect. Fourth, the material of the backfill layer 120 should be thermally stable (e.g., showing minimal cracking, blistering, or popping) above the temperature of the upper range of the future process steps. Typically the materials used for this layer undergo a condensation curing step, which causes shrinkage and the build-up of compressive stresses within the coating. There are a few materials strategies which are used to minimize the formation of these residual stresses which have been put to use in several commercial coatings which satisfy all of the above criteria. Generally, highly branched organosilicon materials can satisfy the criteria for acceptable materials for the backfill layer 120.

In some cases, the highly branched organosilicon material comprises highly branched organosilicon oligomers, highly branched organosilicon polymers, or combinations thereof. In one particular embodiment, the backfill layer 120 comprises a silsesquioxane, and in some cases, the silsesquioxane comprises a vinyl silsesquioxane. The backfill layer 120 may be capable of being cured by actinic radiation such as ultraviolet (UV) radiation, thermally, or by a combination of actinic radiation cure and thermal cure. The highly branched organosilicon material may further include inorganic particles, such as glasses or ceramics that can be index-matched to the organosilicon material, forming a composite material, such as a nanoparticle-filled silsesquioxane.

In many embodiments, the materials useful in the present invention belong to a class of the highly branched organosilicon oligomers and polymers of a general formula (as below) which can be further reacted to form crosslinked networks by homo-condensation of Si—OH groups, heterocondensation with the remaining hydrolyzable groups (e.g. alkoxy), and/or by reactions of the functional organic groups (e.g. ethylenically unsaturated). This class of materials is derived primarily from organosilanes of a general formula:

$$R_xSiZ_{4-x},$$

wherein

R is selected from hydrogen, substituted or unsubstituted $C_1$-$C_{20}$ alkyl, substituted or unsubstituted $C_2$-$C_{10}$ alkylene, substituted or unsubstituted $C_2$-$C_{20}$ alkenylene, $C_2$-$C_{20}$ alkynylene, substituted or unsubstituted $C_3$-$C_{20}$ cycloalkyl, substituted or unsubstituted $C_6$-$C_{20}$ aryl, substituted or unsubstituted $C_6$-$C_{20}$ arylene, a substituted or unsubstituted $C_7$ to $C_{20}$ arylalkyl group, a substituted or unsubstituted $C_1$ to $C_{20}$ heteroalkyl group, a substituted or unsubstituted $C_2$ to $C_{20}$ heterocycloalkyl group, and/or combinations of these.

Z is a hydrolyzable group, such as halogen (containing the elements F, Br, Cl, or I), $C_1$-$C_{20}$ alkoxy, $C_5$-$C_{20}$ aryloxy, and/or combinations of these.

The majority of the composition may consist of $RSiO_{3/2}$ units thus the class of materials is often called silsesquioxanes (or T-resins), however they may also contain mono-($R_3Si$—$O_{1/2}$), di-($R_2SiO_{2/2}$) and tetrafunctional groups (Si—$O_{4/2}$). Organically-modified disilanes of the formula:

$$Z_{3-n}R_nSi-Y-Si\ R_nZ_{3-n}$$

are often used in the hydrolyzable compostions to further modify the properties of the materials (to form the so-called bridged silsesquioxanes), the R and Z groups are defined above. The materials can be further formulated and reacted with metal alkoxides ($M(OR)_m$) to form metallo-silsesquioxanes.

In many embodiments the highly branched organosilicon oligomers and polymers of a general formula:

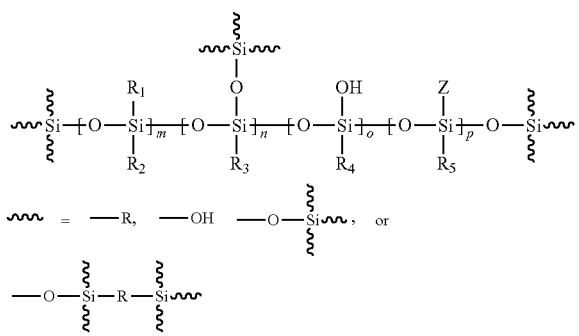

$R_1$ is selected from hydrogen, substituted or unsubstituted $C_1$-$C_{20}$ alkyl, substituted or unsubstituted $C_2$-$C_{10}$ alkylene, substituted or unsubstituted $C_2$-$C_{20}$ alkenylene, $C_2$-$C_{20}$ alkynylene, substituted or unsubstituted $C_3$-$C_{20}$ cycloalkyl, substituted or unsubstituted $C_6$-$C_{20}$ aryl, substituted or unsubstituted $C_6$-$C_{20}$ arylene, a substituted or unsubstituted $C_7$ to $C_{20}$ arylalkyl group, a substituted or unsubstituted $C_1$ to $C_{20}$ heteroalkyl group, a substituted or unsubstituted $C_2$ to $C_{20}$ heterocycloalkyl group, and/or combinations of these;

$R_2$ is selected from hydrogen, substituted or unsubstituted $C_1$-$C_{20}$ alkyl, substituted or unsubstituted $C_2$-$C_{10}$ alkylene, substituted or unsubstituted $C_2$-$C_{20}$ alkenylene, $C_2$-$C_{20}$ alkynylene, substituted or unsubstituted $C_3$-$C_{20}$ cycloalkyl, substituted or unsubstituted $C_6$-$C_{20}$ aryl, substituted or unsubstituted $C_6$-$C_{20}$ arylene, a substituted or unsubstituted $C_7$ to $C_{20}$ arylalkyl group, a substituted or unsubstituted $C_1$ to $C_{20}$ heteroalkyl group, a substituted or unsubstituted $C_2$ to $C_{20}$ heterocycloalkyl group, and/or combinations of these;

$R_3$ is selected from hydrogen, substituted or unsubstituted $C_1$-$C_{20}$ alkyl, substituted or unsubstituted $C_2$-$C_{10}$ alkylene, substituted or unsubstituted $C_2$-$C_{20}$ alkenylene, $C_2$-$C_{20}$ alkynylene, substituted or unsubstituted $C_3$-$C_{20}$ cycloalkyl, substituted or unsubstituted $C_6$-$C_{20}$ aryl, substituted or unsubstituted $C_6$-$C_{20}$ arylene, a substituted or unsubstituted $C_7$ to $C_{20}$ arylalkyl group, a substituted or unsubstituted $C_1$ to $C_{20}$ heteroalkyl group, a substituted or unsubstituted $C_2$ to $C_{20}$ heterocycloalkyl group, and/or combinations of these;

$R_4$ is selected from hydrogen, substituted or unsubstituted $C_1$-$C_{20}$ alkyl, substituted or unsubstituted $C_2$-$C_{10}$ alkylene, substituted or unsubstituted $C_2$-$C_{20}$ alkenylene, $C_2$-$C_{20}$ alkynylene, substituted or unsubstituted $C_3$-$C_{20}$ cycloalkyl, substituted or unsubstituted $C_6$-$C_{20}$ aryl, substituted or unsubstituted $C_6$-$C_{20}$ arylene, a substituted or unsubstituted $C_7$ to $C_{20}$ arylalkyl group, a substituted or unsubstituted $C_1$ to $C_{20}$ heteroalkyl group, a substituted or unsubstituted $C_2$ to $C_{20}$ heterocycloalkyl group, and/or combinations of these;

$R_5$ is selected from hydrogen, substituted or unsubstituted $C_1$-$C_{20}$ alkyl, substituted or unsubstituted $C_2$-$C_{10}$ alkylene, substituted or unsubstituted $C_2$-$C_{20}$ alkenylene, $C_2$-$C_{20}$ alkynylene, substituted or unsubstituted $C_3$-$C_{20}$ cycloalkyl, substituted or unsubstituted $C_6$-$C_{20}$ aryl, substituted or unsubstituted $C_6$-$C_{20}$ arylene, a substituted or unsubstituted $C_7$ to $C_{20}$ arylalkyl group, a substituted or unsubstituted $C_1$ to $C_{20}$ heteroalkyl group, a substituted or unsubstituted $C_2$ to $C_{20}$ heterocycloalkyl group, and/or combinations of these;

Z is a hydrolyzable group, such as halogen (containing the elements F, Br, Cl, or I), $C_1$-$C_{20}$ alkoxy, C-$C_{20}$ aryloxy, and/or combinations of these.

m is an integer from 0 to 500;
n is an integer from 1 to 500;
p is an integer from 0 to 500;
q is an integer from 0 to 100.

As used herein, the term "substituted" refers to one substituted with at least a substituent selected from the group consisting of a halogen (containing the elements F, Br, Cl, or I), a hydroxy group, an alkoxy group, a nitro group, a cyano group, an amino group, an azido group, an amidino group, a hydrazino group, a hydrazone group, a carbonyl group, a carbonyl group, a thiol group, an ester group, a carboxyl group or a salt thereof, a sulfonic acid group or a salt thereof, a phosphoric acid group or a salt thereof, alkyl group, a $C_2$ to $C_{20}$ alkenyl group, a $C_2$ to $C_{20}$ alkynyl group, $C_6$ to $C_{30}$ aryl group, a $C_7$ to $C_{13}$ arylalkyl group, a $C_1$ to $C_4$ oxyalkyl group, a $C_1$ to $C_{20}$ heteroalkyl group, a $C_3$ to $C_{20}$ heteroarylalkyl group, a $C_3$ to $C_{30}$ cycloalkyl group, a $C_3$ to $C_{15}$ cycloalkenyl group, a $C_6$ to $C_{15}$ cycloalkynyl group, a heterocycloalkyl group, and a combination thereof, instead of hydrogen of a compound.

The resulting highly branched organosilicon polymer has a molecular weight in a range from 150 to 300,000 Da or preferably in a range from 150 to 30,000 Da.

Preferably, the transfer layer (or thermally stable backfill) contains the reaction product of the hydrolysis and condensation of a methyltriethoxysilane precursor in a polar solvent. After synthesis, the resulting polymer preferably has a molecular weight of nominally less than 30,000 Da. The thermally stable backfill solution also preferably includes less than fifty percent by weight silica nanoparticles nominally of a size between 10-50 nanometers.

A thermally stable material is utilized to form the thermally stable backfill layer of the transfer film. Any of the materials listed elsewhere as being suitable for use in the transfer layer, can be used as the thermally stable materials. The thermally stable material includes thermally stable molecular species. It is understood that the thermally stable material and the thermally stable molecular species includes precursor materials that either are or transform into materials that remain substantially intact during the removal of sacrificial materials, such as during "bake out" or pyrolysis.

Materials that may be used for the backfill include polysiloxane resins, polysilazanes, polyimides, silsesquioxanes of bridge or ladder-type, silicones, and silicone hybrid materials and many others. Exemplary polysiloxane resins are available under the trade designation PERMANEW 6000, available from California Hardcoating Company, Chula Vista, Calif. These molecules typically have an inorganic component which leads to high dimensional stability, mechanical strength, and chemical resistance, and an organic component that helps with solubility and reactivity.

In many embodiments the thermally stable molecular species includes silicon, hafnium, strontium, titanium or zirconium. In some embodiments the thermally stable molecular species includes a metal, metal oxide or metal oxide precursor. Metal oxide precursors may be used in order to act as an amorphous "binder" for inorganic nanoparticles, or they may be used alone.

The backfill compositions described herein preferably comprise inorganic nanoparticles. These nanoparticles can be of various sizes and shapes. The nanoparticles can have an average particle diameter less than about 1000 nm, less than about 100 nm, less than about 50 nm, or less than about 35 nm. The nanoparticles can have an average particle diameter from about 3 nm to about 50 nm, or from about 3 nm to about 35 nm, or from about 5 nm to about 25 nm. If the nanoparticles are aggregated, the maximum cross sectional dimension of the aggregated particle can be within any of these ranges, and can also be greater than about 100 nm. "Fumed" nanoparticles, such as silica and alumina, with primary size less than about 50 nm, may also be used, such as CAB-OSPERSE PG 002 fumed silica, CAB-O-SPERSE 2017A fumed silica, and CAB-OSPERSE PG 003 fumed alumina, available from Cabot Co. Boston, Mass. Their measurements can be based on transmission electron microscopy (TEM). Nanoparticles can be substantially fully condensed. Fully condensed nanoparticles, such as the colloidal silicas, typically have substantially no hydroxyls in their interiors. Non-silica containing fully condensed nanoparticles typically have a degree of crystallinity (measured as isolated particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g. zirconia) nanoparticles have a high refractive index whereas amorphous nanoparticles typically have a lower refractive index. Various shapes of the inorganic or organic nanoparticles may be used, such as sphere, rod, sheet, tube, wire, cube, cone, tetrahedron, and the like.

The size of the particles is generally chosen to create a desired optical effect such as transparence or scattering. The nanomaterial composition can also impart various optical properties (i.e refractive index, birefringence), electrical properties (e.g conductivity), mechanical properties (e.g toughness, pencil hardness, scratch resistance) or a combination of these properties. It may be desirable to use a mix of organic and inorganic oxide particle types to optimize an optical or material property and to lower total composition cost.

Examples of suitable inorganic nanoparticles include metal nanoparticles or their respective oxides, including the elements zirconium (Zr), titanium (Ti), hafnium (Hf), aluminum (Al), iron (Fe), vanadium (V), antimony (Sb), tin (Sn), gold (Au), copper (Cu), gallium (Ga), indium (In), chromium (Cr), manganese (Mn), cobalt (Co), nickel (Ni), zinc (Zn), yttrium (Y), niobium (Nb), molybdenum (Mo), technetium (Te), ruthenium (Ru), rhodium (Rh), palladium (Pd), silver (Ag), cadmium (Cd), lanthanum (La), tantalum (Ta), tungsten (W), rhenium (Rh), osmium (Os), iridium (Ir), platinum (Pt), and any combinations thereof.

In a preferred embodiment, nanoparticles of zirconium oxide (zirconia) are used. Zirconia nanoparticles can have a particle size from approximately 5 nm to 50 nm, or 5 nm to 15 nm, or 10 nm. Zirconia nanoparticles can be present in the durable article or optical element in an amount from 10 to 70 wt %, or 30 to 50 wt %. Zirconias for use in materials of the invention are commercially available from Nalco Chemical Co. (Naperville, Ill.) under the product designation NALCO OOSSOO8 and from Buhler AG Uzwil, Switzerland under the trade designation "Buhler zirconia Z-WO sol". Zirconia nanoparticle can also be prepared such as described in U.S. Pat. No. 7,241,437 (Davidson et al.) and U.S. Pat. No. 6,376,590 (Kolb et al.). Titania, antimony oxides, alumina, tin oxides, and/or mixed metal oxide nanoparticles can be present in the durable article or optical element in an amount from 10 to 70 wt %, or 30 to 50 wt %. Densified ceramic oxide layers may be formed via a "sol-gel" process, in which ceramic oxide particles are incorporated into a gelled dispersion with a precursor of at least one modifying component followed by dehydration and firing, as described in U.S. Pat. No. 5,453,104 (Schwabel). Mixed metal oxide for use in materials of the invention are commercially available from Catalysts & Chemical Industries Corp., (Kawasaki, Japan) under the product designation OPTOLAKE.

Other examples of suitable inorganic nanoparticles include elements and alloys known as semiconductors and their respective oxides such as silicon (Si), germanium (Ge), silicon carbide (SiC), silicon germanide (SiGe), aluminium nitride (AlN), aluminium phosphide (AlP), boron nitride (BN), boron carbide ($B_4C$), gallium antimonide (GaSb), indium phosphide (InP), gallium arsenide nitride (GaAsN), gallium arsenide phosphide (GaAsP), indium aluminum arsenide nitride (InAlAsN), zinc oxide (ZnO), zinc selenide (ZnSe), zinc sulfide (ZnS), zinc telluride (ZnTe), mercury zinc selenide (HgZnSe), lead sulfide (PbS), lead telluride (PbTe), tin sulfide (SnS), lead tin telluride (PbSnTe), thallium tin telluride ($Tl_2SnTe_5$), zinc phosphide ($Zn_3P_2$), zinc arsenide ($Zn_3As_2$), zinc antimonide ($Zn_3Sb_2$), lead(II) iodide ($PbI_2$), copper(I) oxide ($Cu_2O$).

Silicon dioxide (silica) nanoparticles can have a particle size from 5 nm to 75 nm or 10 nm to 30 nm or 20 nm. Silica nanoparticles are typically in an amount from 10 to 60 wt.-%. Typically the amount of silica is less than 40 wt %. Suitable silicas are commercially available from Nalco Chemical Co. (Naperville, Ill.) under the trade designation NALCO COLLOIDAL SILICAS. For example, silicas 10 include NALCO trade designations 1040, 1042, 1050, 1060, 2327 and 2329. the organosilica under the product name IPA-ST-MS, IPA-ST-L, IPA-ST, IPA-ST-UP, MA-ST-M, and MAST sols from Nissan Chemical America Co. Houston, Tex. and the SNOWTEX ST-40, ST-50, ST-20L, ST-C, ST-N, ST-O, ST-OL, ST-ZL, ST-UP, and ST-OUP, also from Nissan Chemical America Co. Houston, Tex. Suitable fumed silicas include for example, products sold under the tradename, AEROSIL series OX-50, -130, -150, and -200 available from DeGussa AG, (Hanau, Germany), and CAB-O-SPERSE 2095, CAB-O-SPERSE A105, CAB-O-SIL M5 available from Cabot Corp. (Tuscola, Ill.). The weight ratio of polymerizable material to nanoparticles can range from about 30:70, 40:60, 50:50, 55:45, 60:40, 70:30, 80:20 or 90:10 or more. The preferred ranges of weight percent of nanoparticles range from about 10 wt % to about 60% by weight, and can depend on the density and size of the nanoparticle used.

Within the class of semiconductors include nanoparticles known as "quantum dots," which have interesting electronic and optical properties that can be used in a range of applications. Quantum dots can be produced from binary alloys such as cadmium selenide, cadmium sulfide, indium arsenide, and indium phosphide, or from ternary alloys such as cadmium selenide sulfide, and the like. Companies that sell quantum dots include Nanoco Technologies (Manchester, UK) and Nanosys (Palo Alto, Calif.).

Examples of suitable inorganic nanoparticles include elements known as rare earth elements and their oxides, such as lanthanum (La), cerium ($CeO_2$), praseodymium ($Pr_6O_{11}$), neodymium ($Nd_2O_3$), samarium ($Sm_2O_3$), europium ($Eu_2O_3$), gadolinium ($Gd_2O_3$), terbium ($Tb_4O_7$), dysprosium ($Dy_2O_3$), holmium ($Ho_2O_3$), erbium ($Er_2O_3$), thulium ($Tm_2O_3$), ytterbium ($Yb_2O_3$) and lutetium ($Lu_2O_3$). Additionally, phosphorescent materials known as "phosphors" may be included in the thermally stable backfill material. These may include calcium sulfide with strontium sulfide with bismuth as an activator (CaxSr)S: Bi, Zinc sulfide with copper "GS phosphor", mixtures of zinc sulfide and cadmium sulfide, strontium aluminate activated by Europium ($SrAl_2O_4$:Eu(II):Dy(III)), $BaMgAl_{10}O_{17}$:$Eu^{2+}$ (BAM), $Y_2O_3$:Eu, doped ortho-silicates, Yttrium aluminum garnet (YAG) and Lutetium aluminum garnet (LuAG) containing materials, any combinations thereof, and the like. A commercial example a phosphor may include one of the ISI-PHOR™ inorganic phosphors (available from Merck KGaA, Darmstadt, Germany).

The nanoparticles are typically treated with a surface treatment agent. Surface-treating the nano-sized particles can provide a stable dispersion in the polymeric resin. Preferably, the surface-treatment stabilizes the nanoparticles so that the particles will be well dispersed in a substantially homogeneous composition. Furthermore, the nanoparticles can be modified over at least a portion of its surface with a surface treatment agent so that the stabilized particle can copolymerize or react with the parts of the composition during curing. In general, a surface treatment agent has a first end that will attach to the particle surface (covalently, ionically or through strong physisorption) and a second end that imparts compatibility of the particle with the composition and/or reacts with composition during curing. Examples of surface treatment agents include alcohols, amines, carboxylic acids, sulfonic acids, phosphonic acids, silanes and titanates. The preferred type of treatment agent is determined, in part, by the chemical nature of the metal oxide surface. Silanes are preferred for silica and other for siliceous fillers. Silanes and carboxylic acids are preferred for metal oxides such as zirconia. The surface modification can be done either subsequent to mixing with the monomers or after mixing. It is preferred in the case of silanes to react the silanes with the particle or nanoparticle surface before incorporation into the composition. The required amount of surface modifier is dependent upon several factors such particle size, particle type, modifier molecular weight, and modifier type. In general it is preferred that approximately a monolayer of modifier is attached to the surface of the particle. The attachment procedure or reaction conditions required also depend on the surface modifier used. For silanes, it is preferred to surface treat at elevated temperatures under acidic or basic conditions for from 1-24 hr approximately. Surface treatment agents such as carboxylic acids may not require elevated temperatures or extended time.

Representative embodiments of surface treatment agents suitable for the compositions include compounds such as, for example, isooctyl trimethoxy-silane, N-(3-triethoxysilylpropyl) methoxyethoxyethoxyethyl carbamate ($PEG_3TES$), N-(3-triethoxysilylpropyl) methoxyethoxyethoxyethyl carbamate ($PEG_2TES$), 3-(methacryloyloxy)propyltrimethoxysilane, 3-acryloxypropyltrimethoxysilane, 3-(methacryloyloxy)propyltriethoxysilane, 3-(methacryloyloxy) propylmethyldimethoxysilane, 3-(acryloyloxypropyl)methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy) silane, styrylethyltrimethoxysilane, mercaptopropyltrimethoxysilane, 3-5 glycidoxypropyltrimethoxysilane, acrylic acid, methacrylic acid, oleic acid, stearic acid, dodecanoic acid, 2-[2-(2-methoxyethoxy) ethoxy]acetic acid (MEEAA), beta-carboxyethylacrylate, 2-(2-methoxyethoxy)acetic acid, methoxyphenyl acetic acid, and mixtures thereof. Further, a proprietary silane surface modifier, commercially available from OSI Specialties, Crompton South Charleston, W. Va. under the trade designation "Silquest A1230", has been found particularly suitable.

In some embodiments the thermally stable molecular species includes a metal, metal oxide or metal oxide precursor. Metal oxide precursors may be used in order to act as an amorphous "binder" for inorganic nanoparticles, or they may be used alone. Sol-gel techniques may be used to react these precursors in order to cure the material into a solid mass and are known to those skilled in the art. Suitable metal oxide precursors include alkyl titanates such as titanium (IV) butoxide, n-propyl titanate, titanium triethanolamine, titanium phosphate glycol, 2-ethylhexyl titanate, titanium (IV) ethoxide, titanium (IV) isopropoxide, and the like. These are commercially available under the "TYZOR" trade name owned by Dorf-Ketal Inc. (Houston, Tex.). Also suitable metal oxide precursors include zirconium chloride or zirconium(IV) alkoxides such as zirconium (IV) acrylate, zirconium(IV) tetraisopropoxide, zirconium(IV) tetraethoxide, zirconium(IV) tetrabutoxide, and the like, all available from Aldrich (St. Louis, Mo.). Also suitable metal oxide precursors include hafnium(IV) chloride or hafnium alkoxides such as hafnium(IV) carboxyethyl acrylate, hafnium (IV) tetraisopropoxide, hafnium(IV) tert-butoxide, hafnium (IV) n-butoxide, also available from Aldrich (St. Louis, Mo.). These materials can also be used as inorganic nanomaterials in the sacrificial template layer in order to form the bridging layer.

Backfill Layer—Thermal and Radiation Cure

In some embodiments, the backfill layer is an optically transparent or translucent thermoset or radiation curable polymer. Examples of suitable curable mixtures include thermoset materials such as the curable materials used to prepare polyurethanes, polyepoxides, polyacrylates, silicones, and the like. In some cases, to maximize optical performance, the refractive index of the microstructured resin can be adjusted. This is typically done by the addition of metal oxide nanoparticles. Examples of these materials include but are not restricted to zirconium oxide, titanium oxide, and cerium oxide. The nanoparticles are typically treated to chemically alter their surface in order to make them compatible and sometimes reactive with the microstructure resin.

In some embodiments, a photocurable highly branched polyvinyl silsesquioxane solution, typically photocurable upon exposure to actinic radiation (typically ultraviolet radiation) can be cast against a template layer and then exposed to actinic radiation while in contact with the template layer to form the backfill layer.

Patterning

Still further, an additional advantage can be the ability to pattern the transfer layers by printing or otherwise depositing material in a pattern on the template layer, including, for example, screen printing, flexo printing, ink-jet printing, gravure printing, and the like, such as by techniques known to those of skill in the art.

Diffuser Layer

In one particular embodiment, the transfer tape 100 further includes an optional diffuser layer 150 disposed adjacent the planar surface 122, and the optional diffuser layer 150 includes an outer surface 152 capable of adhering to a glass surface (not shown), as described elsewhere. In some embodiments, the optional diffuser layer 150 may comprise the same material as the backfill layer 120. In yet other embodiments, the optional diffuser layer 150 may comprise the same material as the optional adhesive layer and function as both a diffuser and an adhesive. In this case, layer 150 can be termed an adhesive diffuser layer. The index of refraction of the optional diffuser layer 150 can be the same or different than the index of refraction of the backfill layer 120. In some cases, the optional diffuser layer 150 comprises a particle-filled portion of the backfill layer 120 or optional adhesive layer. The optional diffuser layer 150 can also comprise a tackified silicone polyoxamide resin. Suitable diffusers and particles useful for diffusers are known in the art, and can be found, for example, in PCT Publications WO2013/078278, entitled OPTICAL STACK WITH ASYMMETRIC DIFFUSER, and WO2012/134787, entitled HYBRID LIGHT REDIRECTING AND LIGHT DIFFUSING CONSTRUCTIONS.

Optional Adhesive

When a thermally- or radiation-curable materials is used as the backfill layer, it is typically adhered to the glass receptor surface by an adhesive layer that is provided on the transfer layer or on the glass surface. Examples of suitable adhesives include, for example, heat activated adhesives, pressure sensitive adhesives or curable adhesives Examples of suitable optically clear adhesives include those described in U.S. Pat. No. 6,887,917 (Yang et al.) and U.S. Pat. No. 7,947,376 (Sherman et al). Depending upon the nature of the adhesive, the adhesive coating may have a release liner attached to it to protect the adhesive coating from premature adhesion to surfaces and from dirt and other debris which can adhere to the adhesive surface. The release liner typically remains in place until the light redirecting laminate is to be attached to the substrate. Typically, a pressure sensitive adhesive is used Optional Sacrificial Adhesive The sacrificial adhesive layer can be implemented with any material enhancing adhesion of the transfer film to the receptor substrate without substantially adversely affecting the performance of the transfer film. This layer can also be described as an adhesion promoting layer. The sacrificial adhesive layer appears to facilitate the final permanent bond between the receptor substrate and the baked-out thermally stable structure. The sacrificial adhesive layer is capable of being cleanly baked out during the methods described herein, and further, the sacrificial adhesive layer can be loaded with other materials including particles, pigments, dyes and the like, such as known to one of skill in the art.

The inorganic materials present in a sacrificial layer can have a binder present in that layer. The function of the binder is to hold the inorganic materials, particularly if they are nanoparticles, in a matrix so that during or after bake-out a densified layer of inorganics or inorganic nanomaterials results. In some embodiments, binders can be used in disclosed transfer tapes and articles that are substantially devoid of inorganic nanomaterials. Examples of inorganic matrix-forming binders can include metal alkoxides such as alkyl titanates, alkyl zirconates, and alkyl silicates. Other inorganic binder precursors can include polysiloxane resins, polysilazanes, polyimides, silsesquioxanes of bridge or ladder-type, silicones, and silicone hybrid materials.

In some embodiments, inorganic nanomaterials may be dispersed in the sacrificial support film, the sacrificial template layer or both. These sacrificial layers comprise a sacrificial materials component (e.g. a sacrificial polymer such as PMMA) and may further comprise a thermally stable materials component (e.g. an inorganic nanomaterial, an inorganic binder, or thermally stable polymer). Bake-out of the laminate article involves the decomposition of sacrificial material in the sacrificial film or layer(s) while leaving the thermally stable materials component(s) substantially intact. The sacrificial materials component of sacrificial template or the sacrificial support carrier film composition may vary from 1 to 99.9 wt % of the total solids of the formulation, or preferably from 40 to 99 wt % by weight of the total solids of the formulation.

Release Liner

The optional release liner 170 can be a release liner that can protect the patterned structured layer during handling and can be easily removed, when desired, for transfer of the structured layer or part of the structured layer to a receptor substrate. Exemplary liners useful for the disclosed patterned structured tape are disclosed in PCT Pat. Appl. Publ. No. WO 2012/082536 (Baran et al.).

The liner may be flexible or rigid. Preferably, it is flexible. A suitable liner (preferably, a flexible liner) is typically at least 0.5 mil thick, and typically no more than 20 mils thick. The liner may be a backing with a release coating disposed on its first surface. Optionally, a release coating can be disposed on its second surface. If this backing is used in a transfer article that is in the form of a roll, the second release coating has a lower release value than the first release coating. Suitable materials that can function as a rigid liner include metals, metal alloys, metal-matrix composites, metalized plastics, inorganic glasses and vitrified organic resins, formed ceramics, and polymer matrix reinforced composites.

Exemplary liner materials include paper and polymeric materials. For example, flexible backings include densified Kraft paper (such as those commercially available from Loparex North America, Willowbrook, Ill.), poly-coated paper such as polyethylene coated Kraft paper, and polymeric film. Suitable polymeric films include polyester, polycarbonate, polypropylene, polyethylene, cellulose, polyamide, polyimide, polysilicone, polytetrafluoroethylene, polyethylenephthalate, polyvinylchloride, polycarbonate, or combinations thereof. Nonwoven or woven liners may also be useful. Embodiments with a nonwoven or woven liner could incorporate a release coating. CLEARSIL T50 Release liner; silicone coated 2 mil polyester film liner, available from Solutia/CP Films, Martinsville, Va., and LOPAREX 5100 Release Liner, fluorosilicone-coated 2 mil polyester film liner available from Loparex, Hammond, Wis., are examples of useful release liners.

Adhesion Promoting Layer Materials

An adhesion promoting layer can be implemented with any material enhancing adhesion of the transfer film to the receptor substrate without substantially adversely affecting the performance of the transfer film. The exemplary materials for the transfer layer 120 can also be used for the adhesion promoting layer. Useful adhesion promoting materials useful in the disclosed articles and methods include photoresists (positive and negative), self-assembled monolayers, adhesives, silane coupling agents, and macromolecules. In some embodiments, silsesquioxanes can function as adhesion promoting layers. For example, polyvinyl silsesquioxane polymers can be used as an adhesion promoting layer. Other exemplary materials may include benzocyclobutanes, polyimides, polyamides, silicones, polysiloxanes, silicone hybrid polymers, (meth)acrylates, and other silanes or macromolecules functionalized with a wide variety of reactive groups such as epoxide, episulfide, vinyl, hydroxyl, allyloxy, (meth)acrylate, isocyanate, cyanoester, acetoxy, (meth)acrylamide, thiol, silanol, carboxylic acid, amino, vinyl ether, phenolic, aldehyde, alkyl halide, cinnamate, azide, aziridine, alkene, carbamates, imide, amide, alkyne, and any derivatives or combinations of these groups.

Other Additives

Other suitable additives to include in any of the layers of the transfer tape are antioxidants, stabilizers, antiozonants and/or inhibitors to prevent premature curing during the process of storage, shipping and handling of the film. Preventing premature curing can maintain the tack required for lamination transfer in all previously mentioned embodiments. Antioxidants can prevent the formation of free radical species, which may lead to electron transfers and chain reactions such as polymerization. Antioxidants can be used to decompose such radicals. Suitable antioxidants may include, for example, antioxidants under the IRGANOX tradename. The molecular structures for antioxidants are typically hindered phenolic structures, such as 2,6-di-tert-butylphenol, 2,6-di-tert-butyl-4-methylphenol, or structures based on aromatic amines. Secondary antioxidants are also used to decompose hydroperoxide radicals, such as phosphites or phosphonites, organic sulphur containing compounds and dithiophosphonates. Typical polymerization inhibitors include quinone structures such hydroquinone, 2,5 di-tert-butyl-hydroquinone, monomethyl ether hydroquinone or catechol derivatives such as 4-tert butyl catechol. Any antioxidants, stabilizers, antiozonants and inhibitors used preferably are soluble in the layers transferred.

Receptor Substrate

A particular advantage of the transfer films and the associated process of applying the transfer films, is the ability to impart structure to receptor surfaces with large surfaces, such as architectural glass. The large dimensions of the lamination transfer films are possible by using a combination of roll-to-roll processing and a cylindrical master template. An additional advantage of the transfer process disclosed herein is the ability to impart structure to receptor surfaces that are not planar. The receptor substrate can be curved, bent twisted, or have concave or convex features, due to the flexible format of the transfer tape. Receptor substrates may include, for example, automotive glass, sheet glass, flexible electronic substrates such as circuitized flexible film, display backplanes, solar glass, metal, polymers, polymer composites, and fiberglass. Still further, an additional advantage can be the ability to pattern the transfer layers by printing or otherwise depositing material in a pattern on the template films, by techniques known to those of skill in the art, as described elsewhere.

Figure 2A:
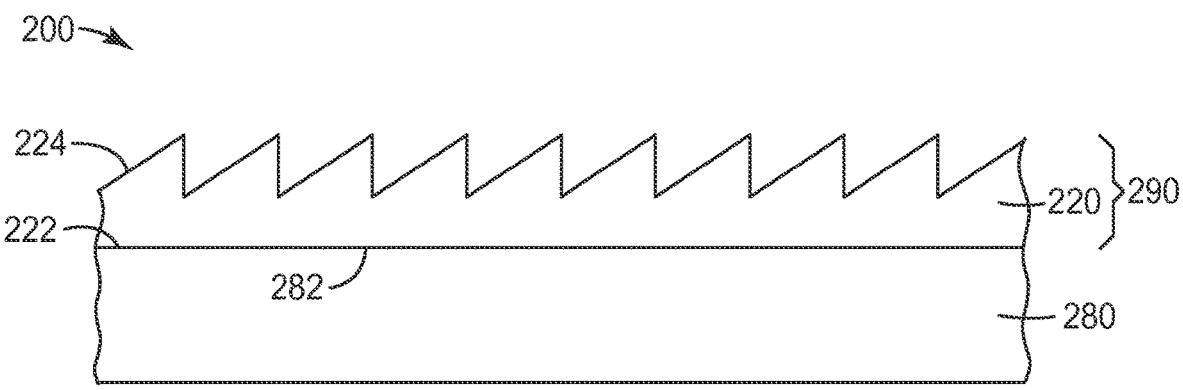
FIGS. 2A-2K show schematic cross-sectional views of a microoptical glazing.

FIGS. 2A-2I show schematic cross-sectional views of a microoptical glazing, according to one aspect of the disclosure. In FIG. 2A, microoptical glazing 200 includes a receptor substrate 280 such as a pane of glass having a major surface 282, and a microoptical layer 290 bonded to at least a portion of the major surface 282. The microoptical layer 290 comprises a cured backfill layer 220 having a planar surface 222 immediately adjacent the major surface 282, and an opposing structured surface 224. In one particular embodiment, the cured backfill layer 220 comprises a highly branched organosilicon material, as described elsewhere. The structured surface 224 is adjacent a low index material having an index of refraction lower than the cured backfill layer 220. It is to be understood that each of the additional layers (e.g., 130, 150, 160) described with reference to FIG. 1A can also be positioned in a like manner adjacent the cured backfill layer 220 (i.e., the cured backfill layer 120 of FIG. 1A), but are not shown in FIG. 2A for clarity.

Figure 2B:
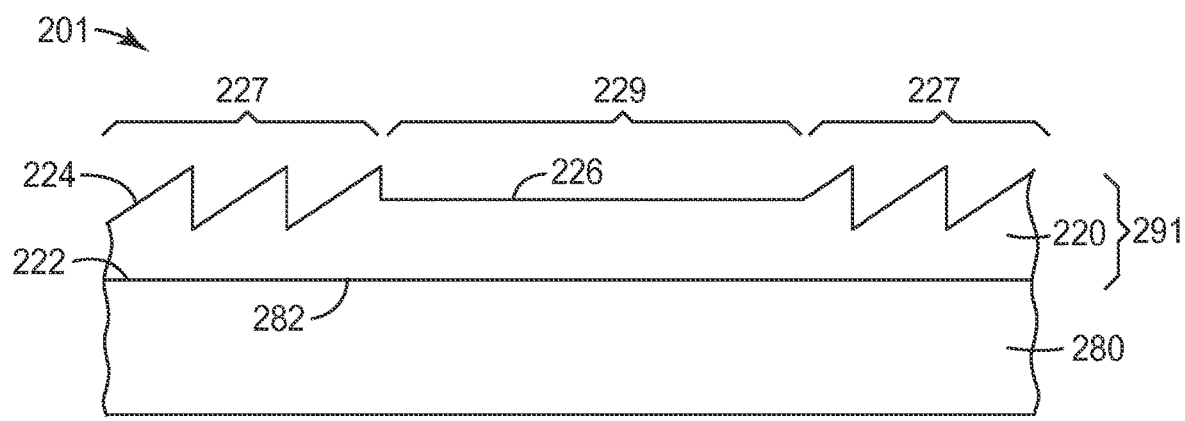

In FIG. 2B, microoptical glazing 201 includes a receptor substrate 280 such as a pane of glass having a major surface 282, and a microoptical layer 291 bonded to at least a portion of the major surface 282. The microoptical layer 291 comprises a cured backfill layer 220 having a planar surface 222 immediately adjacent the major surface 282, and an opposing surface that includes a first portion 227 having structured surface 224, and an adjacent second portion 229 having planar regions 226, that are disposed in a pattern. In one particular embodiment, the cured backfill layer 220 comprises a highly branched organosilicon material, and the microoptical layer 291 can result by transfer from a transfer tape 102 as shown and described in FIG. 1C. In one particular embodiment, the second portion 229 (i.e., the planar regions 226) of the cured backfill layer 220 can result by reflow from an uncured portion of the transfer tape 100 as shown in FIG. 1A. An integrated photomask, such as one provided on the optional carrier film 140, can be used to pattern the cured and uncured (i.e., material that can be reflowed to a planar state), the technique of reflow described, for example, in Applicants' pending applications, U.S. Pat. Publ. Nos. 2014/0021492; 2014/0178646; and 2014/0175707; and U.S. Provisional Appl. No. 61/902,437, entitled NANOSTRUCTURES FOR OLED DEVICES, filed Nov. 11, 2013.

The structured surface 224 and planar regions 226 are adjacent a low index material having an index of refraction lower than the cured backfill layer 220. It is to be understood that each of the additional layers (e.g., 130, 150, 160) described with reference to FIG. 1A can also be positioned in a like manner adjacent the cured backfill layer 220 (i.e., the cured backfill layer 120 of FIG. 1A), but are not shown in FIG. 2B for clarity.

The pattern formed by the first and second portions 227, 229, of the microoptical glazing 201 can comprises a plurality of islands, dots, lines, solid areas, solid areas with holes, or a combination thereof that extend over the surface of the receptor substrate 280, and can further comprise a gradient in areal density of the structured surface 224 from one end of the receptor substrate 280 to an opposing end, as shown elsewhere.

Figure 2C:
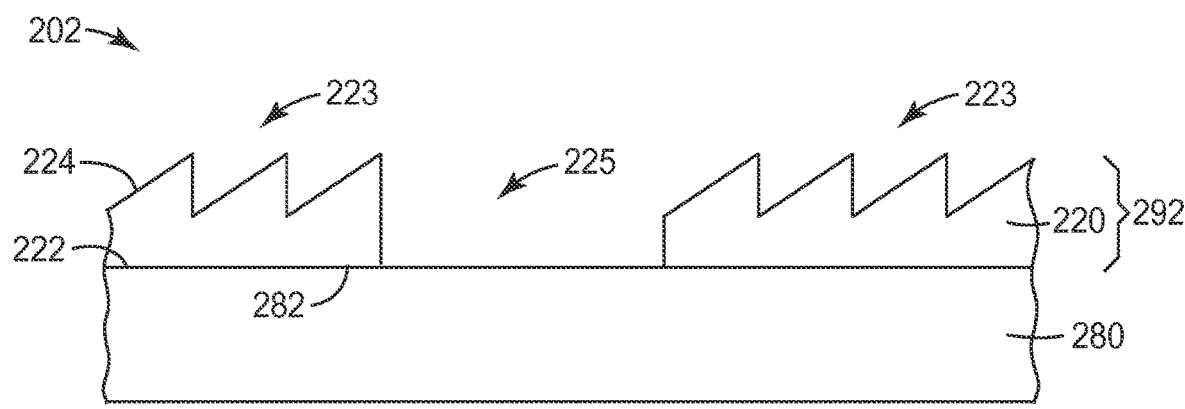

In FIG. 2C, microoptical glazing 202 includes a receptor substrate 280 such as a pane of glass having a major surface 282, and a microoptical layer 292 bonded to at least a portion of the major surface 282. The microoptical layer 292 comprises a cured backfill layer 220 having a planar surface 222 immediately adjacent the major surface 282, and an opposing surface that includes a first portion 223 having structured surface 224, and an adjacent second portions 225 lacking the microoptical layer 292, that are disposed in a pattern. In one particular embodiment, the cured backfill layer 220 comprises a highly branched organosilicon material, and the microoptical layer 292 can result by transfer from a transfer tape 101 as shown and described in FIG. 1B.

The structured surface 224 of the first portion 223, and the adjacent second portions 225 are adjacent a low index material having an index of refraction lower than the cured backfill layer 220. It is to be understood that each of the additional layers (e.g., 130, 150, 160) described with reference to FIG. 1A can also be positioned in a like manner adjacent the cured backfill layer 220 (i.e., the cured backfill layer 120 of FIG. 1A), but are not shown in FIG. 2C for clarity.

The pattern formed by the first and second portions 223, 225, of the microoptical glazing 202 can comprises a plurality of islands, lines, or a combination of islands and lines that extend over the surface of the receptor substrate 280, and can further comprise a gradient in areal density of the structured surface 224 from one end of the receptor substrate 280 to an opposing end, as shown elsewhere.

Figure 2D:
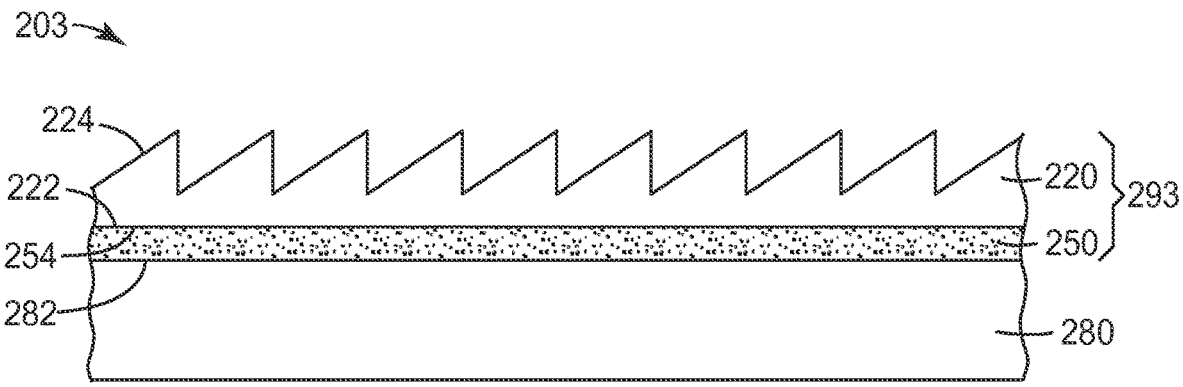

In FIG. 2D, microoptical glazing 203 includes a receptor substrate 280 such as a pane of glass having a major surface 282, and a microoptical layer 293 bonded to at least a portion of the major surface 282. The microoptical layer 293 comprises a cured backfill layer 220 having a planar surface 222 and an opposing structured surface 224, and a cured diffuser layer 250 having a surface 254 adjacent the planar surface 222, the cured diffuser layer 250 being immediately adjacent the major surface 282. In one particular embodiment, the cured backfill layer 220 comprises a highly branched organosilicon material, as described elsewhere. In some cases, the cured diffuser layer 250 can comprise particles, and can in some cases, also comprise the same material as the cured backfill layer 220. The structured surface 224 is adjacent a low index material having an index of refraction lower than the cured backfill layer 220. It is to be understood that each of the additional layers (e.g., 130, 160) described with reference to FIG. 1A can also be positioned in a like manner adjacent the cured backfill layer 220 (i.e., the cured backfill layer 120 of FIG. 1A), but are not shown in FIG. 2D for clarity.

Figure 2E:
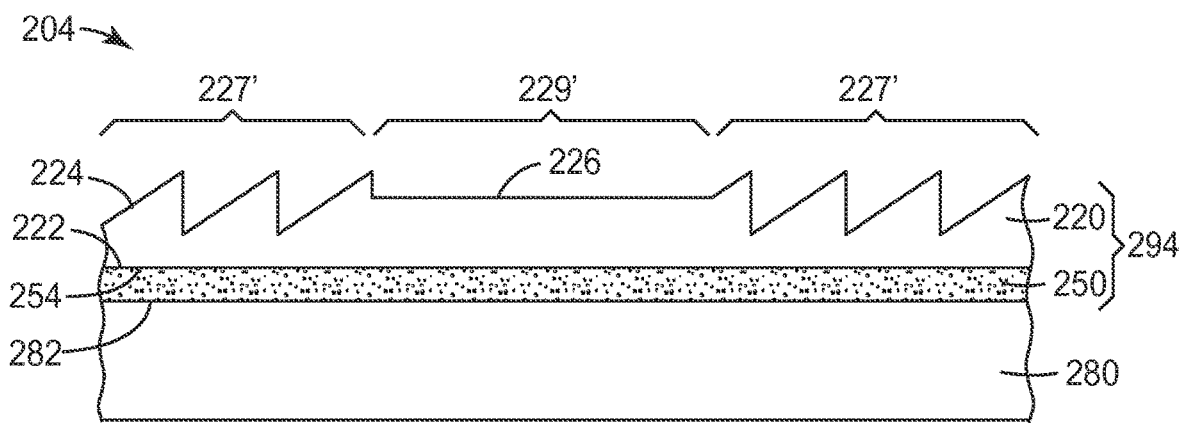

In FIG. 2E, microoptical glazing 204 includes a receptor substrate 280 such as a pane of glass having a major surface 282, and a microoptical layer 294 bonded to at least a portion of the major surface 282. The microoptical layer 294 comprises a cured backfill layer 220 having a planar surface 222, and an opposing surface that includes a first portion 227' having structured surface 224, and an adjacent second portion 229' having planar regions 226, that are disposed in a pattern. The microoptical layer 294 further includes a cured diffuser layer 250 having a surface 254 adjacent the planar surface 222, the cured diffuser layer 250 being immediately adjacent the major surface 282. In one particular embodiment, the cured backfill layer 220 comprises a highly branched organosilicon material, as described elsewhere. In some cases, the cured diffuser layer 250 can comprise particles, and can in some cases, also comprise the same material as the cured backfill layer 220.

In one particular embodiment, the microoptical layer 294 can result by transfer from a transfer tape 102 as shown and described in FIG. 1C. In one particular embodiment, the second portion 229' (i.e., the planar regions 226) of the microoptical layer 294 can result by reflow from an uncured portion of the transfer tape 100 as shown in FIG. 1A, the technique of reflow described, for example, in Applicants' pending applications, above.

The structured surface 224 and planar regions 226 are adjacent a low index material having an index of refraction lower than the cured backfill layer 220. It is to be understood that each of the additional layers (e.g., 130, 160) described with reference to FIG. 1A can also be positioned in a like manner adjacent the cured backfill layer 220 (i.e., the cured backfill layer 120 of FIG. 1A), but are not shown in FIG. 2E for clarity.

The pattern formed by the first and second portions 227', 229', of the microoptical glazing 201 can comprise a plurality of islands, lines, or a combination of islands and lines that extend over the surface of the receptor substrate 280, and can further comprise a gradient in areal density of the structured surface 224 from one end of the receptor substrate 280 to an opposing end, as shown elsewhere.

Figure 2F:
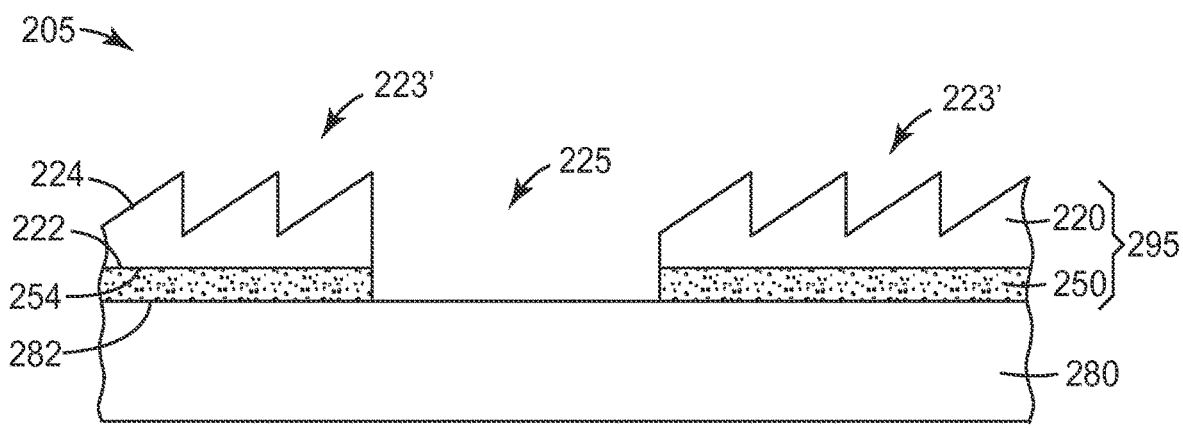

In FIG. 2F, microoptical glazing 205 includes a receptor substrate 280 such as a pane of glass having a major surface 282, and a microoptical layer 295 bonded to at least a portion of the major surface 282. The microoptical layer 295 comprises a cured backfill layer 220 having a planar surface 222 immediately adjacent the major surface 282, and an opposing surface that includes a first portion 223 having structured surface 224, and an adjacent second portions 225 lacking the microoptical layer 295, that are disposed in a pattern. The microoptical layer 295 further includes a cured diffuser layer 250 having a surface 254 adjacent the planar surface 222, the cured diffuser layer 250 being immediately adjacent the major surface 282. In one particular embodiment, the cured backfill layer 220 comprises a highly branched organosilicon material, as described elsewhere. In some cases, the cured diffuser layer 250 can comprise particles, and can in some cases, also comprise the same material as the cured backfill layer 220. In one particular embodiment, the microoptical layer 295 can result by transfer from a transfer tape 101 as shown and described in FIG. 1B.

The structured surface 224 of the first portion 223', and the adjacent second portions 225' are adjacent a low index material having an index of refraction lower than the cured backfill layer 220. It is to be understood that each of the additional layers (e.g., 130, 160) described with reference to FIG. 1A can also be positioned in a like manner adjacent the cured backfill layer 220 (i.e., the cured backfill layer 120 of FIG. 1A), but are not shown in FIG. 2F for clarity.

The pattern formed by the first and second portions 223', 225, of the microoptical glazing 205 can comprise a plurality of islands, lines, or a combination of islands and lines that extend over the surface of the receptor substrate 280, and can further comprise a gradient in areal density of the structured surface 224 from one end of the receptor substrate 280 to an opposing end, as shown elsewhere.

Figure 2G:
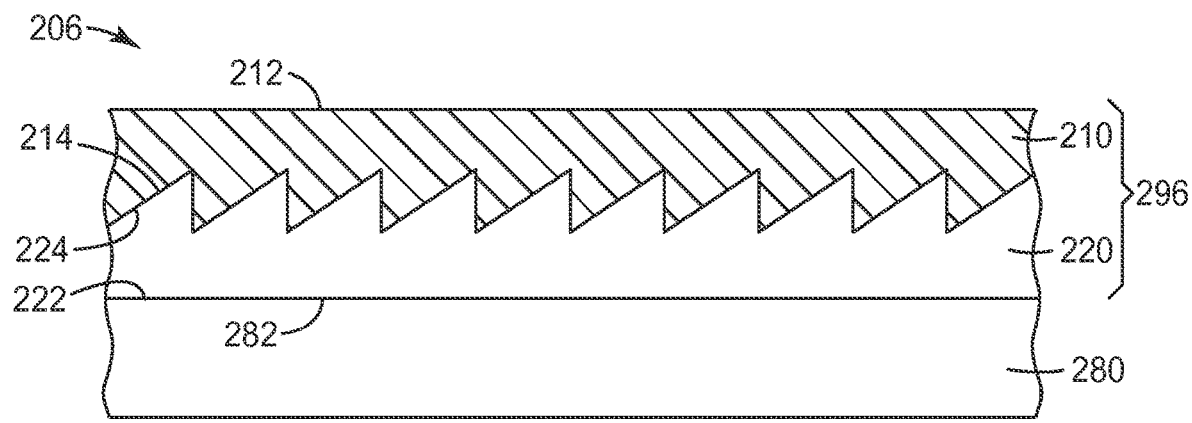

In FIG. 2G, microoptical glazing 206 includes a receptor substrate 280 such as a pane of glass having a major surface 282, and a microoptical layer 296 bonded to at least a portion of the major surface 282. The microoptical layer 296 comprises a cured backfill layer 220 having a planar surface 222 immediately adjacent the major surface 282, and an opposing structured surface 224. In one particular embodiment, the cured backfill layer 220 comprises a highly branched organosilicon material, as described elsewhere. The structured surface 224 is adjacent a template layer 210 having an index of refraction different than the cured backfill layer 220. In one particular embodiment, the template layer 210 can comprise the same material as the cured backfill layer 220, and can further include particles such as would be useful in a diffuser. In some cases surface 212 may comprise a surface diffuser. It is to be understood that each of the additional layers (e.g., 130, 150, 160) described with reference to FIG. 1A can also be positioned in a like manner adjacent the cured backfill layer 220 (i.e., the cured backfill layer 120 of FIG. 1A), but are not shown in FIG. 2G for clarity.

Figure 2H:
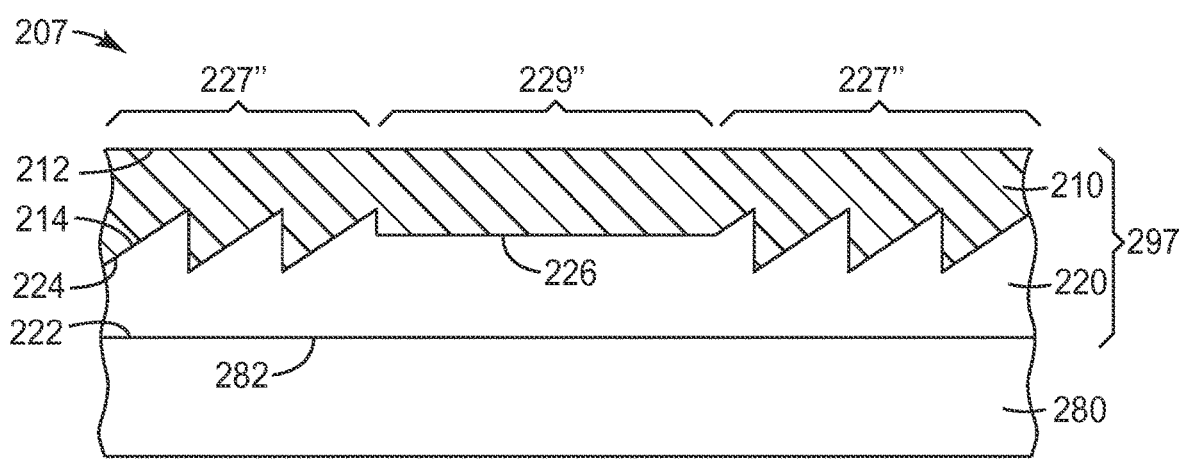

In FIG. 2H, microoptical glazing 207 includes a receptor substrate 280 such as a pane of glass having a major surface 282, and a microoptical layer 297 bonded to at least a portion of the major surface 282. The microoptical layer 297 comprises a cured backfill layer 220 having a planar surface 222 immediately adjacent the major surface 282, and an opposing surface that includes a first portion 227" having structured surface 224, and an adjacent second portion 229" having planar regions 226, that are disposed in a pattern.

In one particular embodiment, the cured backfill layer 220 comprises a highly branched organosilicon material, and the microoptical layer 297 can result by transfer from a transfer tape 102 as shown and described in FIG. 1C. In one particular embodiment, the second portion 229 (i.e., the planar regions 226) of the cured backfill layer 220 can result by reflow from an uncured portion of the transfer tape 100 as shown in FIG. 1A, the technique of reflow described, for example, in Applicants' pending applications, described above.

The structured surface 224 and the planar regions 226 are adjacent a template layer 210 having an index of refraction different than the cured backfill layer 220. In one particular embodiment, the template layer 210 can comprise the same material as the cured backfill layer 220, and can further include particles such as would be useful in a diffuser. In some cases surface 212 may comprise a surface diffuser. It is to be understood that each of the additional layers (e.g., 130, 150, 160) described with reference to FIG. 1A can also be positioned in a like manner adjacent the cured backfill layer 220 (i.e., the cured backfill layer 120 of FIG. 1A), but are not shown in FIG. 2H for clarity.

The pattern formed by the first and second portions 227", 229", of the microoptical glazing 207 can comprises a plurality of islands, lines, or a combination of islands and lines that extend over the surface of the receptor substrate 280, and can further comprise a gradient in areal density of the structured surface 224 from one end of the receptor substrate 280 to an opposing end, as shown elsewhere.

Figure 2I:
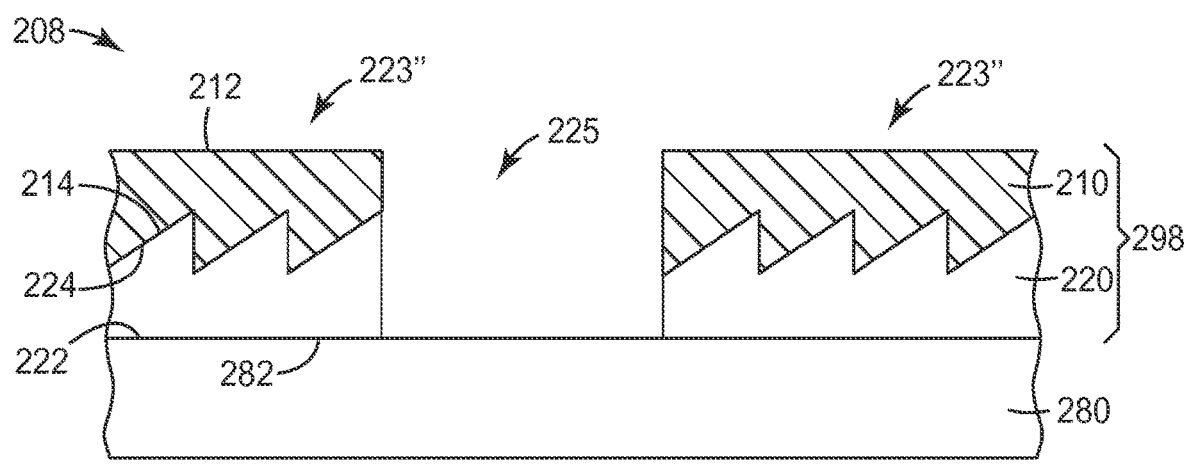

In FIG. 2I, microoptical glazing 208 includes a receptor substrate 280 such as a pane of glass having a major surface 282, and a microoptical layer 298 bonded to at least a portion of the major surface 282. The microoptical layer 298 comprises a cured backfill layer 220 having a planar surface 222 immediately adjacent the major surface 282, and an opposing surface that includes a first portion 223" having structured surface 224, and an adjacent second portions 225 lacking the microoptical layer 292, that are disposed in a pattern. In one particular embodiment, the cured backfill layer 220 comprises a highly branched organosilicon material, and the microoptical layer 298 can result by transfer from a transfer tape 101 as shown and described in FIG. 1B.

The structured surface 224 of the first portion 223", and the adjacent second portion 225 are adjacent a template layer 210 having an index of refraction different than the cured backfill layer 220. In one particular embodiment, the template layer 210 can comprise the same material as the cured backfill layer 220, and can further include particles such as would be useful in a diffuser. In some cases surface 212 may comprise a surface diffuser. It is to be understood that each of the additional layers (e.g., 130, 150, 160) described with reference to FIG. 1A can also be positioned in a like manner adjacent the cured backfill layer 220 (i.e., the cured backfill layer 120 of FIG. 1A), but are not shown in FIG. 2I for clarity.

The pattern formed by the first and second portions 223", 225, of the microoptical glazing 208 can comprise a plurality of islands, lines, or a combination of islands and lines that extend over the surface of the receptor substrate 280, and can further comprise a gradient in areal density of the structured surface 224 from one end of the receptor substrate 280 to an opposing end, as shown elsewhere.

Figure 3A:
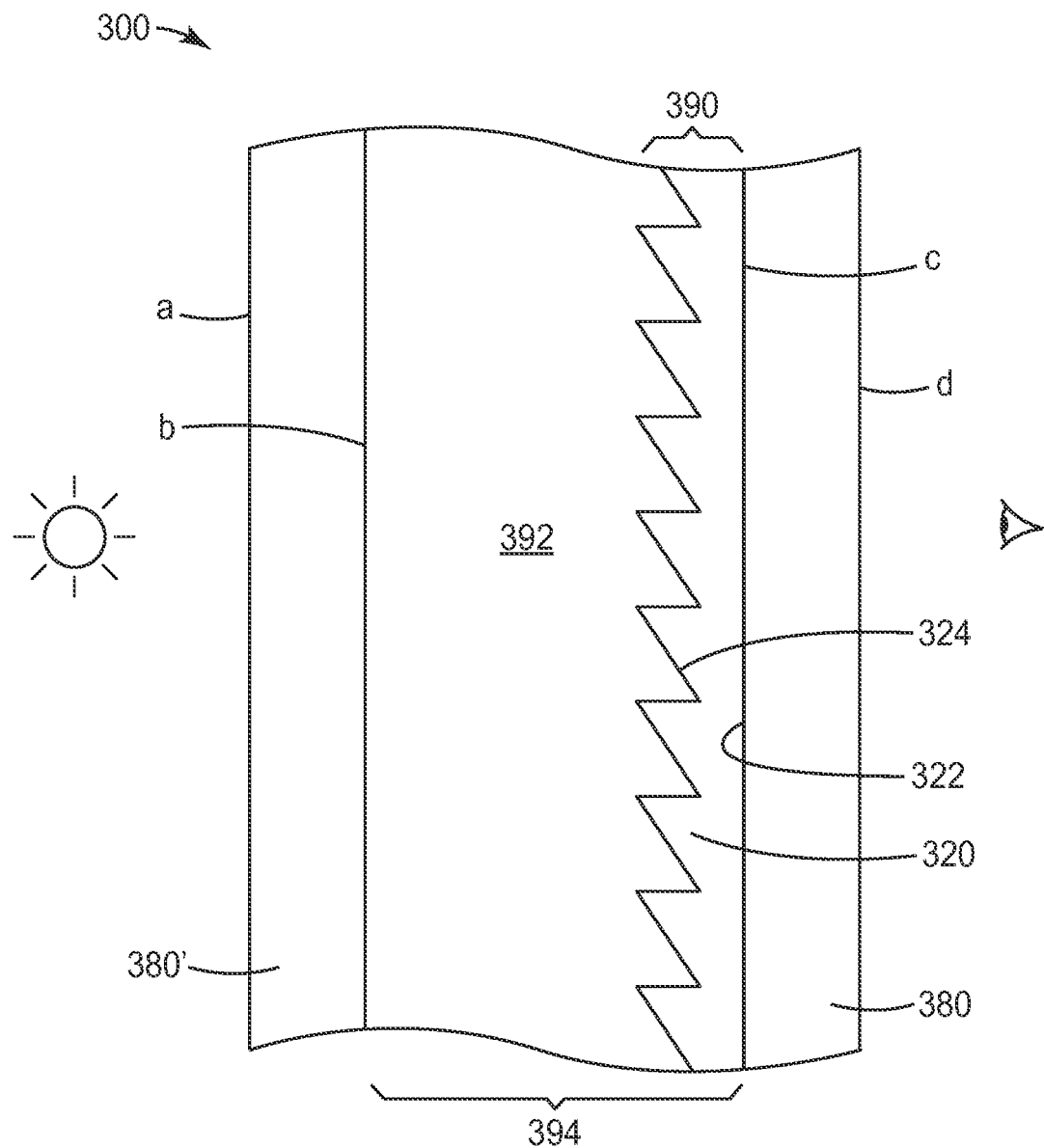
FIG. 3A shows a schematic cross-sectional view of a portion of an Insulated Glazing Unit (IGU)

FIG. 3A shows a schematic cross-sectional view of a portion of an Insulated Glazing Unit (IGU) 300, according to one aspect of the disclosure. IGU 300 includes a first plane of glass 380' separated by a gap 394, from a second pane of glass 380 facing the first pane of glass 380'. The first pane of glass 380' includes an outside surface "a" and a first pane interior surface "b", and the second pane of glass 380 includes a second pane interior surface "c" and an inside surface "d". A microoptical layer 390 is bonded to at least a portion of the second pane interior surface "c", the microoptical layer includes a cured backfill layer 320 having a planar surface 322 immediately adjacent the second pane interior surface "c", and an opposing structured surface 324. The structured surface 324 is adjacent a low index material 392 filling the gap 394 between the first and second panes of glass, 280', 380. In some cases the low index material 392 may comprise a gas or a vacuum. The low index layer 392 provides index contrast with microoptical layer 390.

It is to be understood that the microoptical layer 390 can be any of the microoptical layers described previously, such as microoptical layers 290, 291, 292, 293, 294, 295, 296, 297 and 298 shown in FIGS. 2A-2I, and can also include any of the additional layers as described elsewhere, such as the layers described as elements 130, 150, 160 in FIG. 1A.

Figure 3B:
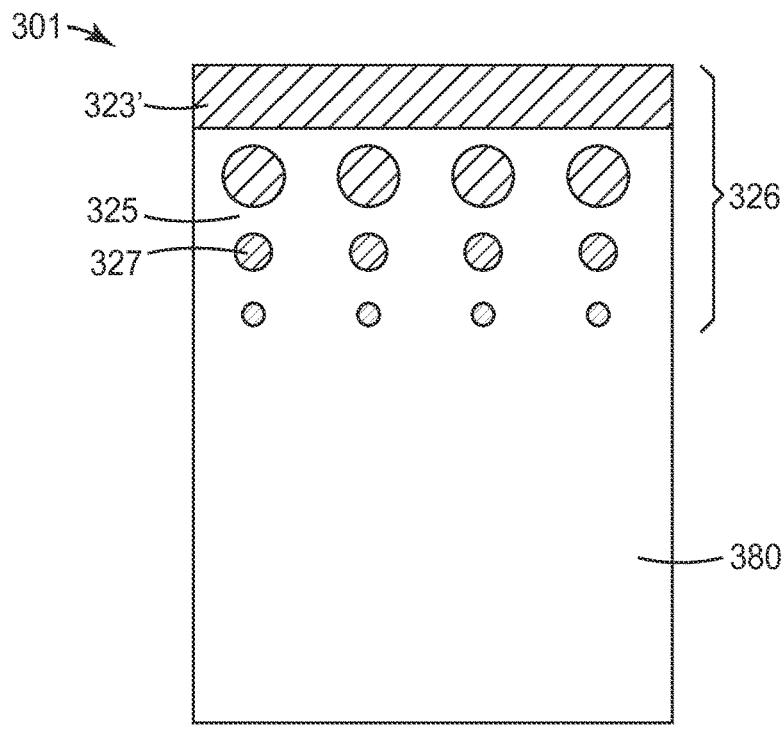
FIG. 3B shows a schematic front view of a microoptical glazing.
Figure 3C:
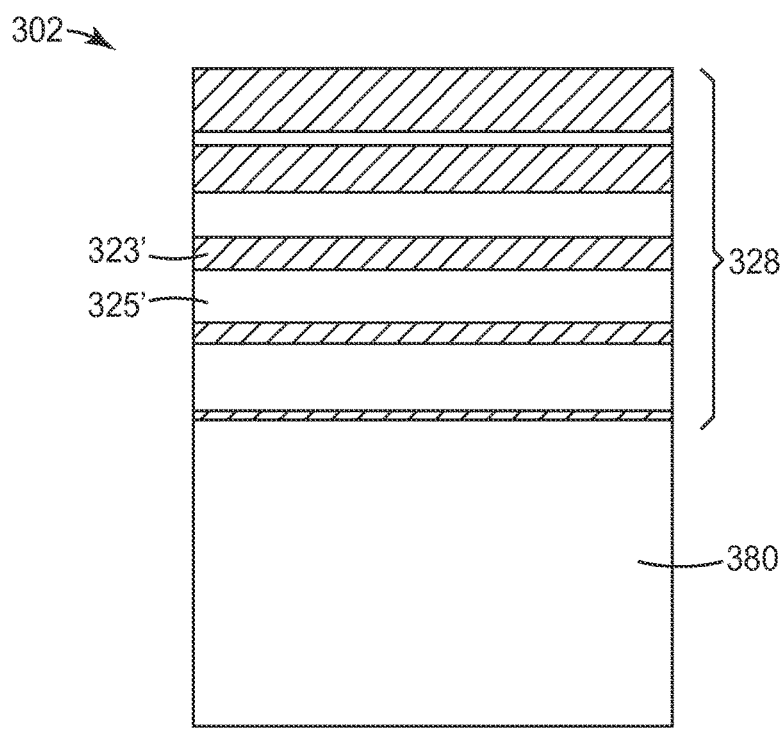
FIG. 3C shows a schematic front view of a microoptical glazing.

FIG. 3B shows a schematic front view of a microoptical glazing 301, or alternately of a transfer tape useful for forming microoptical glazing 301, according to one aspect of the disclosure. Microoptical glazing 301 includes a pattern 326 of structured surface islands 323 and lines 323' separated by regions 325 similar to regions 225, 226 shown in FIG. 2A-2I on pane of glass 380. Pattern 326 shows a gradient pattern that has a decrease in areal density of the structured surface lines 323' and islands 323 moving away from an edge of microoptical glazing 301. FIG. 3C shows a schematic front view of a microoptical glazing 302, according to one aspect of the disclosure. Microoptical glazing 302 includes a pattern 328 of structured surface lines 323' separated by regions 325' similar to regions 225, 226 shown in FIG. 2A-2I on pane of glass 380. Pattern 328 shows a gradient pattern that has a decrease in areal density of the structured surface lines 323' moving away from an edge of microoptical glazing 302. It is to be understood that the pattern 326, 328 need not be a gradient pattern, and may be comprised of any desired assortment of islands, dots, lines, or any other regular or irregular shape.

Figure 4:
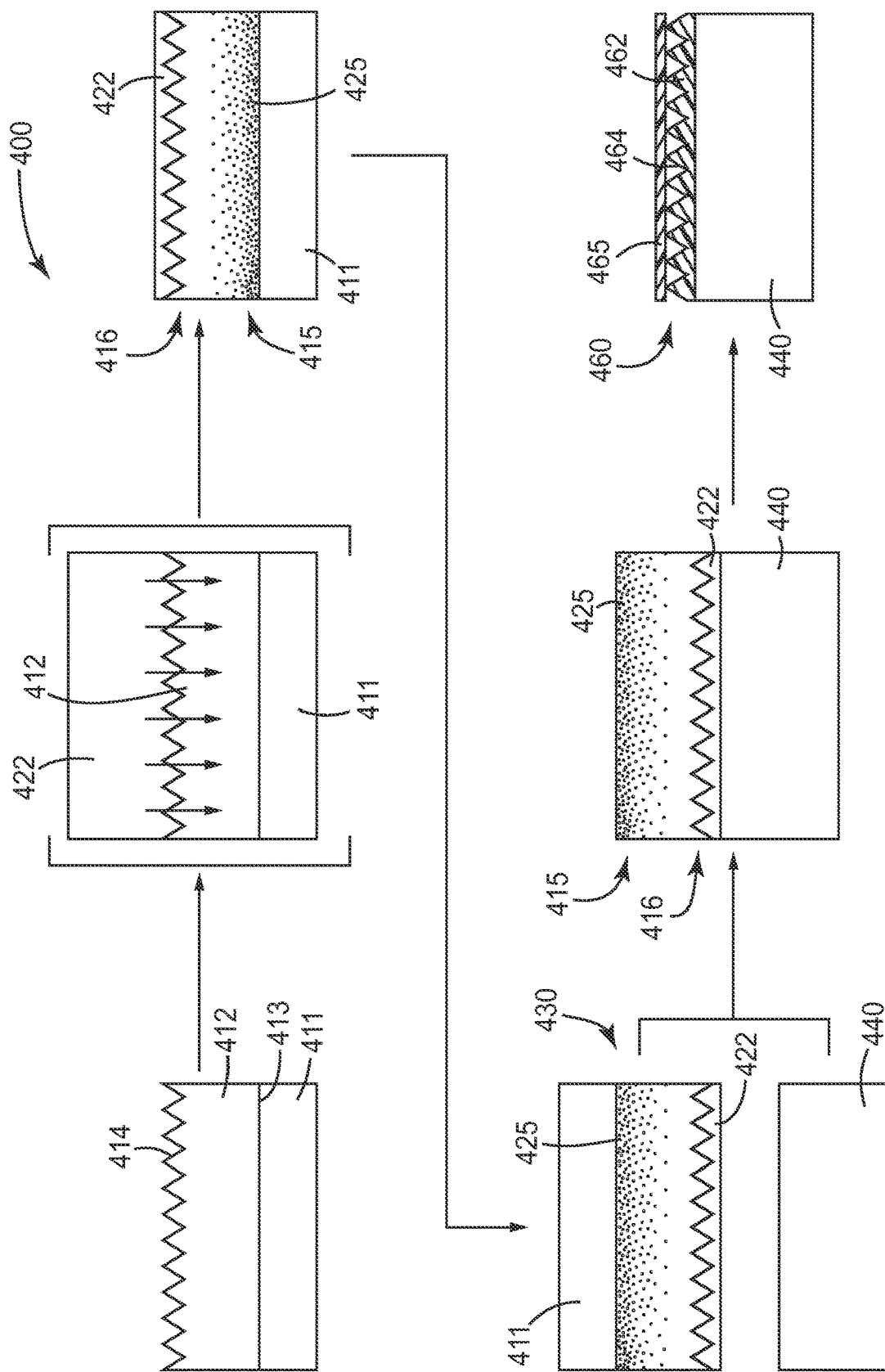
FIG. 4 is a schematic process flow diagram of forming a transfer film and a bridged nanostructure.
Figure 5:
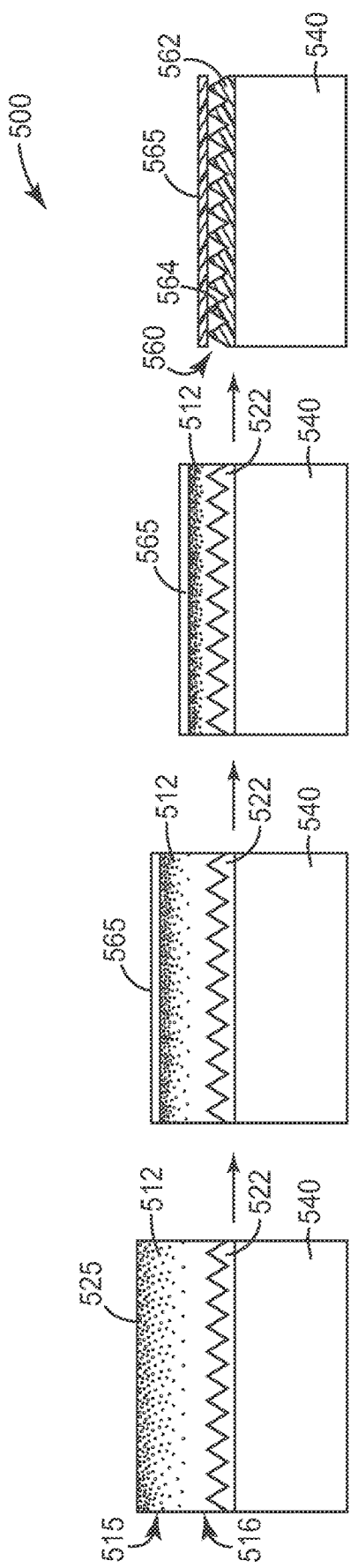
FIG. 5 is a schematic process flow diagram of forming a bridged nanostructure.

FIG. 4 is a schematic process flow diagram of an illustrative method 400 of forming the transfer film 430 and final bridged nanostructure 460 using the high temperature process described above, according to one aspect of the disclosure. FIG. 5 is a schematic process flow diagram of an illustrative bake out method 500 of forming the final bridged nanostructure 560, according to one aspect of the disclosure.

This method 400 includes applying a thermally stable backfill coating solution 422 to a structured surface 414 of a sacrificial template layer 412 and allowing a migratable species (illustrated by the arrows) to migrate from the thermally stable backfill layer 422 to the sacrificial template layer 412, forming the transfer film 430. The thermally stable backfill layer 422 conforms to the structured surface 414 of the sacrificial template layer 412.

The thermally stable backfill solution can be coated onto the structured surface 414 and any solvent or portion of solvent removed and optionally cured to form the thermally stable backfill layer 422. Preferably, after removal of solvent and curing, the thermally stable material substantially planarizes the sacrificial template layer. Substantial planarization means that the amount of planarization (P %), as defined by Equation 1, is greater than 50%, or greater than 75%, or preferably greater than 90%.

$$P\% = (1-(t_1/h_1))*100 \qquad (1)$$

where $t_1$ is the relief height of a surface layer and $h_1$ is the feature height of features covered by the surface layer, as further disclosed in P. Chiniwalla, *IEEE Trans. Adv. Packaging* 24(1), 2001, 41.

The sacrificial template layer 412 can be on an optional carrier film 411 (i.e., liner) having a releasable surface. The optional carrier film 411 can be implemented with a thermally stable flexible film providing mechanical support for the other layers. The optional carrier film 411 has a releasable surface, meaning the optional carrier film 411 allows for release of a material applied to the releasable surface. The optional carrier film 411 may be thermally stable above 50° C., or alternatively 70° C., or alternatively above 120° C., without adversely affecting either the sacrificial layer or the backfill layer. One example of a carrier film is polyethylene terephthalate (PET).

The optional carrier film 411 (described herein) can be embodied as a flexible film providing mechanical support for the other layers. Any of the optional carrier films described previously can be used as the optional carrier film 411. In some embodiments, the optional carrier film can include sacrificial materials that can remain on the transfer film during the bake out process. For example, the optional carrier film may include a sacrificial layer on an optional carrier film where the sacrificial layer remains on the transferred microoptical layer (e.g. 290, 291, 292, 293, 294, 295, 296, 297, 298, 299, 299' as shown in FIGS. 2A-2K), following release from the optional carrier film.

The sacrificial template layer 412 can be nanostructured by any useful method such as a continuous cast and cure process or embossed to produce the structured surface 414. In many embodiments a planar first surface 413 opposes the structured second surface 414. The releasable surface of the carrier layer 411 can contact the planar first surface 413. The sacrificial template layer 412 can be substantially planarized using the backfill layer 422.

In many embodiments, a portion 415 of the sacrificial template layer 412 proximate the first surface 413 has a greater concentration of a thermally stable molecular species than a portion 416 of the sacrificial template layer proximate the second surface 414. In many of these embodiments, the sacrificial template layer 412 has a gradient 425 of thermally stable molecular species and the gradient 425 is a concentration of thermally stable molecular species that changes as a function of a distance (normal to a major surface) away from the structured surface 414 along a thickness direction of the sacrificial template layer 412. In many of these embodiments, the concentration of thermally stable molecular species that migrated into the sacrificial template layer 412 increases as a distance from the structured surface 414. Preferably the concentration of migrated thermally stable molecular species within the sacrificial template layer 412 is greatest about or at the first surface 413.

The transfer film 430 can be laminated to a receptor substrate 440 and exposed to a heating or baking out process to remove the sacrificial template layer 412 and to form engineered voids defined by a bridging layer 465 and the structured surface 464 of the thermally stable backfill layer 462. In some embodiments, an optional sacrificial adhesive layer (not shown) is applied to the backfill layer 422 or to receptor substrate 440, prior to lamination.

The bridging layer 465 is formed from the thermally stable molecular species 425 within the sacrificial template layer 412 and the bridging layer 465 is disposed on the structured surface 464. In many embodiments the bridging layer 465 is formed from the gradient of thermally stable molecular species 425 within the sacrificial template layer 412.

As described and illustrated in FIG. 5, the sacrificial template layer 512 can be cleanly baked out leaving a bridging layer 565 disposed on the structured surface 564 and defining engineered voids. Each of the elements 500-565 shown in FIG. 5 correspond to like-numbered elements 400-465 shown in FIG. 4, which have been described previously. For example, receptor substrate 540 of FIG. 5 corresponds to receptor substrate 440 of FIG. 4, and so on. These figures illustrate that the sacrificial template layer 512 is capable of being baked out while leaving engineered voids defined by a bridging layer 565 and the structured surface 564 of the thermally stable backfill layer 562. The bridging layer 565 is formed from the thermally stable molecular species 525 within the sacrificial template layer 512 and the bridging layer 565 is disposed on the structured surface 564.

The bridge structure forms independently of the inorganic nanostructure that is defined by the sacrificial template layer, gradually forming on top of the nanostructure as the organic polymer decomposes. The space in between the bridge and the engineered nanostructure forms "engineered voids" whose shapes are defined by the bounds of the engineered nanostructure and the bridge. A large volume of sacrificial template layer decomposes during the bake out process as compared to the volume of bridge remaining. In some embodiments, the thickness of the sacrificial template layer is at least 2 times or at least 5 times, or at least 10 times the thickness of the resulting bridge structure.

Figure 6:
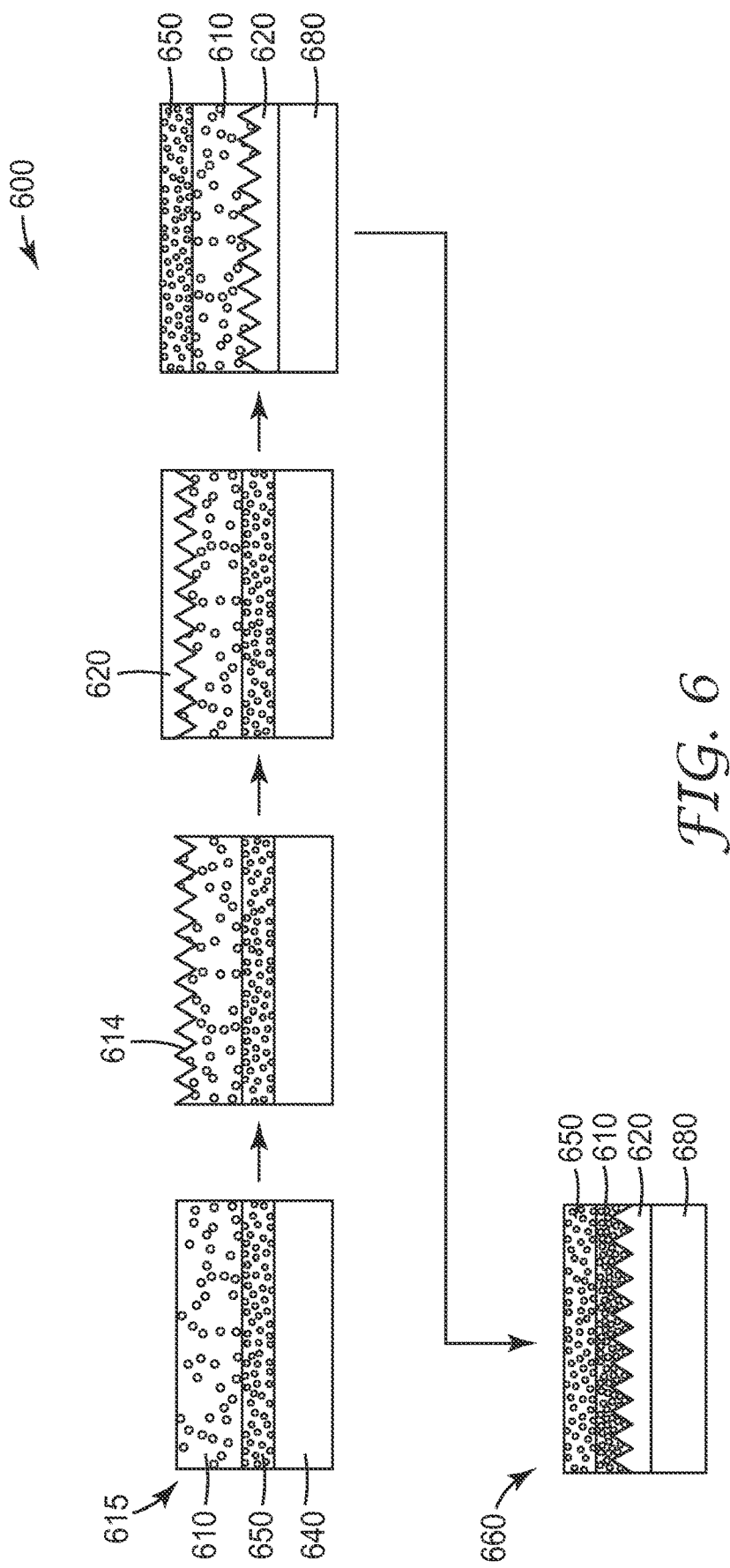
FIG. 6 is a schematic process flow diagram of forming a microoptical glazing.

FIG. 6 is a schematic process flow diagram of an illustrative method 600 of forming a microoptical glazing 660, using the high-temperature bake-out process described above, according to one aspect of the disclosure. A transfer film 615 is prepared that includes an optional carrier film 640 having a diffuser layer 650 and a template layer 610, each of which can comprise nanoparticles in a thermally stable matrix, as described elsewhere. The template layer 610 is patterned to include structures 614 onto which a backfill layer 620 is coated. The transfer film 615 is then transferred onto receptor substrate 680, such as a glass substrate, and the laminate structure baked as described above, to result in microoptical glazing 660. In one particular embodiment, microoptical glazing 660 can include backfill layer 620 that is index-matched to receptor substrate 680, template layer 610 can be a high-index microoptical layer, and diffuser layer 650 can be integral with the template layer 610.

The bake-out process described above can result in structures similar to those shown in FIGS. 2A-2K. In some embodiments, for example, the microoptical glazing 203 shown in FIG. 2D can include a diffuser 250 that is light scattering and has a refractive index similar to the glass 280, i.e., about 1.5, and the structured transfer layer 220 can also have the same refractive index. In some cases, the microoptical glazing 206 shown in FIG. 2G can include a structured layer 220 that has a refractive index similar to that of glass 280 (i.e., about 1.5), and a scattering layer 210 that has a lower index such as less than about 1.4. In some cases, the microoptical glazing 206 shown in FIG. 2G can include a structured layer 220 that has a refractive index similar to that of glass 280 (i.e., about 1.5) and a scattering layer 210 that has a higher index, such as 1.8 or greater.

Figure 2J:
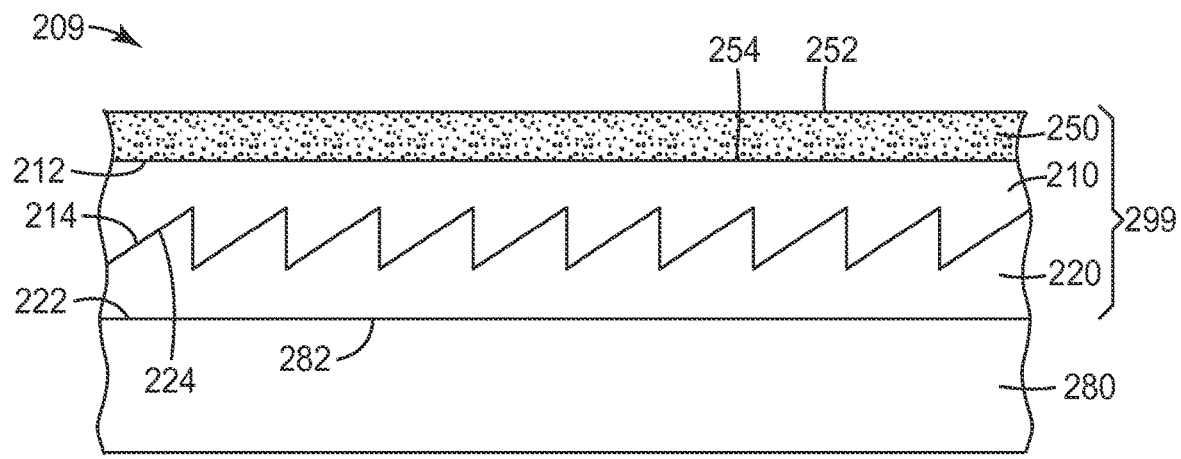

In FIG. 2J, microoptical glazing 209 includes a receptor substrate 280 such as a pane of glass having a major surface 282, and a microoptical layer 299 bonded to at least a portion of the major surface 282. The microoptical layer 299 comprises a cured backfill layer 220 having a planar surface 222 immediately adjacent the major surface 282, and an opposing structured surface 224. In one particular embodiment, the cured backfill layer 220 is a structure having an index similar to the receptor substrate 280, i.e., 1.5. The structured surface 224 is adjacent a layer 210 having an index of refraction greater than the cured backfill layer 220, such as about 1.8. A diffuser layer 250 having a refractive index similar to the layer 210 is positioned adjacent the layer 210.

Figure 2K:
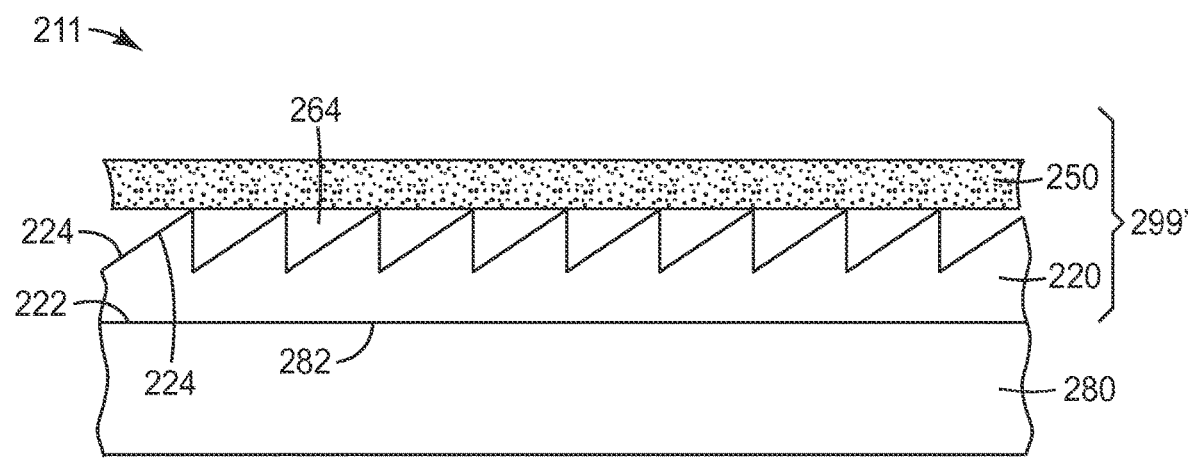

In FIG. 2K, microoptical glazing 211 includes a receptor substrate 280 such as a pane of glass having a major surface 282, and a microoptical layer 299' bonded to at least a portion of the major surface 282. The microoptical layer 299' comprises a cured backfill layer 220 having a planar surface 222 immediately adjacent the major surface 282, and an opposing structured surface 224. In one particular embodiment, the cured backfill layer 220 is a structure having an index similar to the receptor substrate 280, i.e., 1.5. The structured surface 224 is adjacent an engineered voids layer 264 as described above with reference to FIGS. 4-5. A diffuser layer 250 having a refractive index similar to the cured backfill layer 220 is positioned adjacent the engineered voids layer 264.

EXAMPLES

Example 1

Preparation and Transfer of a 90/50 BEF II Structured Surface

Preparation of Vinylsilsesquioxane

Vinyltriethoxysilane (100 g) (Gelest Inc., Morrisville, Pa. USA), deionized water (50 g), and oxalic acid (0.5 g) (Sigma-Aldrich, St. Louis, Mo.) were mixed together at room temperature in a 500 mL round bottom flask equipped with a condenser. The mixture was stirred at room temperature for 6-8 hrs followed by the evaporation of the solvents (water/ethanol mixture). The resulting viscous liquid was dissolved in methyl ethyl ketone (100 mL) and washed three-times with deionized water (100 mL). After washing, the methyl ethyl ketone and residual water were evaporated under reduced pressure to yield vinylsilsesquioxane as a viscous liquid. A vinylsilsesquioxane radiation curable system was prepared by redissolving the vinylsilsesquioxane in methyl ethyl ketone to a 30% w/w solution with 1% w/w Irgacure184 (photoinitiator from Ciba/BASF).

Coating of Transfer Layer

A length of Vikuiti™ BEF II 90/50 (3M Company, St. Paul, Minn.) was coated with Fluorinert FC-40 (Sigma Aldrich, St. Louis, Mo.) release agent by pipette and wiped dry with a Kimwipe. The film was placed in a solvent compatible oven (Despatch LFD series, Despatch Industries, Minneapolis, Minn.) at 100° C. for 10 minutes to dry, creating a release coated structured template. The BEF II film was coated with the vinylsilsesquioxane radiation curable system described above using a notch bar coater set to a gap of 0.006 inches (152.4 microns) under yellow lights. The sample was dried at 50° C. on a hotplate to remove the methyl ethyl ketone. The film was laminated at 180° F. to a 2 inch×3 inch glass slide using a thermal film laminator (GBC Catena 35, GBC Document Finishing, Lincolnshire, Ill.). The laminated sample was removed from the laminator and allowed cool to room temperature. The laminated sample was cured under black lights for 3 minutes and the release coated structured template removed, resulting in a microoptical structured SSQ layer on glass.

Example 2

Preparation and Transfer of a 90/50 BEF II Structured Surface with Integrated Diffuser A length of Vikuiti™ BEF II 90/50 (3M Company, St. Paul, Minn.) was coated with Fluorinert FC-40 (Sigma Aldrich, St. Louis, Mo.) release agent by pipette and wiped dry with a Kimwipe. The film was placed in a solvent compatible oven (Despatch LFD series, Despatch Industries, Minneapolis, Minn.) at 100° C. for 10 minutes to dry, to create a release coated structured template. The BEF II film was coated with the 30% vinylsilsesquioxane described in Example 1 using a notch bar coater set to a gap of 0.006 inches (152.4 microns) under yellow lights. The sample was dried at 50° C. on a hotplate to remove the methyl ethyl ketone.

The coated vinylsilsesquioxane layer was cured in a nitrogen atmosphere with radiation from a Fusion "D" lamp operating at 600 W/in while in contact with the BEF II film tool, to create a cured vinyl silsesquioxane layer on a structured template.

A vinylsilsesquioxane diffuser solution was formulated by mixing a 10% w/w solution of AEROXIDE® TiO2 NKT90 particles (available from Evonic Corporation, Parsippany, N.J.) in the vinyl silsesquioxane radiation curable system described in Example 1. The cured vinyl silsesquioxane layer on the structured template was coated with the vinylsilsesquioxane diffuser solution using a notch bar coater set to a gap of 0.006 inches (152.4 microns) under yellow lights. The sample was dried at 50° C. on a hotplate to remove the methyl ethyl ketone. The film was laminated at 180° F. (82° C.) to a 2 inch×3 inch glass slide using a thermal film laminator (GBC Catena 35, GBC Document Finishing, Lincolnshire, Ill.). The laminated sample was removed from the laminator and allowed cool to room temperature. The laminated sample was cured under black lights for 3 minutes and the release coated structured template removed, resulting in a multilayered microoptical structured SSQ layer on glass.

Example 3

Preparation and Transfer of Dot-Structured Surface 90/50 BEF II

A length of Vikuiti™ BEF II 90/50 (3M Company, St. Paul, Minn.) was coated with Fluorinert FC-40 (Sigma Aldrich, St. Louis, Mo.) release agent by pipette and wiped dry with a Kimwipe. The film was placed in a solvent compatible oven (Despatch LFD series, Despatch Industries, Minneapolis, Minn.) at 100° C. for 10 minutes to dry, creating a release coated structured template. The release coated structured template was pattern coated with the vinylsilsesquioxane radiation curable system described in Example 1 using standard screen printing techniques. The screen was a 156 mesh screen patterned with a series of openings in a dot pattern (each dot approximately 1.25 mm in diameter, separated from adjacent dots by about 3-4 mm) The sample was dried on a hotplate 50 C for 10 minutes. The sample was then laminated using a hand roller to a 2 inch×3 inch (5 cm×7.6 cm) glass slide. The laminated sample was cured under black lights for 3 minutes and the release coated structured template removed, resulting in a patterned microoptical structured SSQ layer on glass.

Example 4

Preparation and Transfer of Dot-structured Surface 90/50 BEF II with Integrated Diffuser A length of Vikuiti™ BEF II 90/50 (3M Company, St. Paul, Minn.) was coated with Fluorinert FC-40 (Sigma Aldrich, St. Louis, Mo.) release agent by pipette and wiped dry with a Kimwipe. The film was placed in a solvent compatible oven (Despatch LFD series, Despatch Industries, Minneapolis, Minn.) at 100° C. for 10 minutes to dry, to create a release coated structured template.

The release coated structured template was pattern coated with the vinylsilsesquioxane radiation curable system described in Example 1 using standard screen printing techniques. The screen was a 156 mesh screen patterned with a series of openings in a dot pattern (each dot approximately 1.25 mm in diameter, separated from adjacent dots by about 3-4 mm) The sample was dried on a hotplate 50 C for 10 minutes. The pattern coated vinylsilsesquioxane layer was cured in a nitrogen atmosphere with radiation from a Fusion "D" lamp operating at 600 W/in while in contact with the BEF II tool, to create a patterned cured vinyl silsesquioxane layer on a structured template.

A vinylsilsesquioxane diffuser solution was formulated by mixing a 10% w/w solution of AEROXIDE® TiO2 NKT90 particles (available from Evonic Corporation, Parsippany, N.J.) in the vinyl silsesquioxane radiation curable system described in Example 1. The patterned cured vinyl silsesquioxane layer on a structured template was pattern coated with the vinylsilsesquioxane diffuser solution using standard screen printing techniques. The screen was the same 156 mesh screen patterned with a series of openings in a dot pattern in registration with the previous patterned layer. The sample was dried at 50° C. on a hotplate to remove the methyl ethyl ketone. The film was laminated at 180° F. (82° C.) to a 2 inch×3 inch (5 cm×7.6 cm) glass slide using a thermal film laminator (GBC Catena 35, GBC Document Finishing, Lincolnshire, Ill.). The laminated sample was removed from the laminator and allowed cool to room temperature. The laminated sample was cured under black lights for 3 minutes and the release coated structured template removed, resulting in a multilayered structured microoptical SSQ layer on glass.

Example 5

Preparation and Transfer of a Daylight Redirecting Structure with Integrated Diffuser Template/Release Coating The base film was a 2-mil PET, primed with a UV cured primer comprising 50/50 blend of UVACURE 1500 (available from Allnex, Smyrna, Ga.) and LAROMER TMPTA (available from BASF Corp., Wyandotte, Mich.) with 1% OMAN 071 photoinitiator (available from Gelest Inc., Philadelphia, Pa.). The replicating resin was a 75/25 blend of PHOTOMER 6210 (available from IGM Resins, Charlotte, N.C.) and hexanediol diacrylate with a photoinitator package comprising of 0.5% LUCRIN TPO (available from BASF Corp., Wyandotte, Mich.). Replication of the resin was conducted at 30 fpm on a tool heated to 125 deg F. The tool was fabricated using a diamond-turning process. The tool was shaped according to the daylight redirecting structure described in U.S. application No. 62/094,626 provisionally filed Dec. 19, 2014.

Radiation from a Fusion "D" lamp operating at 600 W/in was transmitted through the film to cure the resin while in contact with the tool. The composite film was removed from the tool and the patterned side of the film was post UV cured using a Fusion "D" lamp operating at 360 W/in while in contact with a roll heated to 100 deg F.

The replicated template film was placed in a chamber and the surface primed with oxygen gas at a flow rate of standard cc 200/min (SCCM), a pressure of 200 mTorr and RF power of 500 Watts for 30 seconds. Subsequently, the samples were exposed to octafluoropropane ($C_3F_8$) plasma at a flow rate of 250 SCCM but no added oxygen. The pressure in the chamber was 6 mTorr, the RF power 1000 Watts was maintained for 90 seconds.

Backfill/Coating

The release coated template film was die coated on a roll to roll processing line at a line speed of 5 Ft/min and a coating width of 4 inches and a flow rate of 5.8 cc/min with a 70% solids solution of SA-250P (Nagase & CO., LTD, Tokyo, Japan) in MEK. The sample was dried by passing over two five foot heated plates at 200 F and cured with a Fusion H bulb under a nitrogen atmosphere.

Adhesive Coating

The Backfilled template film was notch-bar coated with a 2 mil gap with a silicone adhesive (an adhesive composition was prepared using the same proportions and same MQ resin as described in Example 1 of U.S. Pat. No. 7,947,376 but using the polymer solution described in U.S. Pat. No. 8,765,881 Example 12 mixed with 10% AEROXIDE Tio2 NKT90 particles (available from Evonic Corporation, Parsippany, N.J.)) 30% solids a in ethyl acetate solution. The solution was dried at 50° C. for 5 min on a hot plate, and then hand laminated to a release liner M117 (SILICONATURE USA, LLC, Chicago, Ill.). This formed the Lamination Transfer Film with Daylight Redirecting Optics and a bulk diffuser Lamination to Glass The release liner was removed and the sample was hand laminated to a 2×3 inch glass slide adhesive side down. The structured template was removed resulting in a microptical structure and diffuser layer on glass.

Example 6

Preparation and Transfer of a Daylight Redirecting Structure with Integrated Diffuser (Acrylate Backfill)

Template/Release Coating

The base film was a 2-mil PET, primed with a UV cured primer comprising 50/50 blend of UVACURE 1500 (available from Allnex, Smyrna, Ga.) and LAROMER TMPTA (available from BASF Corp., Wyandotte, Mich.) with 1% OMAN 071 photoinitiator (available from Gelest Inc., Philadelphia, Pa.). The replicating resin was a 75/25 blend of PHOTOMER 6210 (available from IGM Resins, Charlotte, N.C.) and hexanediol diacrylate with a photoinitator package comprising of 0.5% LUCRIN TPO (available from BASF Corp., Wyandotte, Mich.). Replication of the resin was conducted at 30 fpm on a tool heated to 125 deg F. The tool was fabricated using a diamond-turning process. The tool was shaped according to the daylight redirecting structure described in U.S. application No. 62/094,626 provisionally filed Dec. 19, 2014.

Radiation from a Fusion "D" lamp operating at 600 W/in was transmitted through the film to cure the resin while in contact with the tool. The composite film was removed from the tool and the patterned side of the film was post UV cured using a Fusion "D" lamp operating at 360 W/in while in contact with a roll heated to 100 deg F.

The replicated template film was placed in a chamber and the surface primed with oxygen gas at a flow rate of standard cc 200/min (SCCM), a pressure of 200 mTorr and RF power of 500 Watts for 30 seconds. Subsequently, the samples were exposed to octafluoropropane ($C_3F_8$) plasma at a flow rate of 250 SCCM but no added oxygen. The pressure in the chamber was 6 mTorr, the RF power 1000 Watts was maintained for 90 seconds.

Backfill/Coating

The release coated template film was Meyer bar coated with a #30 bar with a mixture of 80% CN2920 and 20% SR 9003 (Sartomer, Exton Pa.) with a 1% w/w LUCRIN TPO (available from BASF Corp., Wyandotte, Mich.) added to the mixture. The coated resin layer was cured in a nitrogen atmosphere with radiation from a fusion "D" lamp operating at 600 W/in while in contact with the template film, to create a cured resin on a structured template.

Adhesive Coating

The Backfilled template film was notch-bar coated with a 2 mil gap with a silicone adhesive (an adhesive composition was prepared using the same proportions and same MQ resin as described in Example 1 of U.S. Pat. No. 7,947,376 but using the polymer solution described in U.S. Pat. No. 8,765,881 Example 12 mixed with 10% AEROXIDE Tio2 NKT90 particles (available from Evonic Corporation, Parsippany, N.J.)) 30% solids a in ethyl acetate solution. The solution was dried at 50° C. for 5 min on a hot plate, and then hand laminated to a release liner M117 (SILICONATURE USA, LLC, Chicago, Ill.). This formed the Lamination Transfer Film with Daylight Redirecting Optics and a bulk diffuser Lamination to Glass The release liner was removed and the sample was hand laminated to a 2×3 inch glass slide adhesive side down. The structured template was removed resulting in a microptical structure and diffuser layer on glass.

Following are a list of embodiments of the present disclosure.

Item 1 is a transfer tape, comprising: a template layer having a structured surface; a backfill layer disposed on at least a portion of the template layer, the backfill layer comprising a highly branched organosilicon material having a planar surface opposite the structured surface; and a diffuser layer disposed adjacent the planar surface, wherein the diffuser layer is capable of adhering to a glass surface, and the template layer is capable of being removed from the backfill layer.

Item 2 is the transfer tape of item 1, wherein the highly branched organosilicon material comprises highly branched organosilicon oligomers, highly branched organosilicon polymers, or combinations thereof.

Item 3 is the transfer tape of item 1 or item 2, further comprising a carrier film disposed on a planar surface of the template layer opposite the structured surface.

Item 4 is the transfer tape of item 1 to item 3, further comprising a transfer layer disposed on and conforming to the structured surface.

Item 5 is the transfer tape of item 1 to item 4, wherein the transfer layer comprises a transfer release coating.

Item 6 is the transfer tape of item 1 to item 5, wherein the transfer layer comprises at least one inorganic layer.

Item 7 is the transfer tape of item 6, wherein the at least one inorganic layer comprises an inorganic thin film stack.

Item 8 is the transfer tape of item 7, wherein the inorganic thin film stack comprises a low emissivity coating.

Item 9 is the transfer tape of item 1 to item 8, wherein the index of refraction of the diffuser layer is different than the index of refraction of the backfill layer.

Item 10 is the transfer tape of item 1 to item 9, further comprising a separation layer disposed between the diffuser layer and the planar surface, wherein the index of refraction of the separation layer is different than the index of refraction of the backfill layer.

Item 11 is the transfer tape of item 1 to item 10, wherein the backfill layer comprises a silsesquioxane.

Item 12 is the transfer tape of item 11, wherein the silsesquioxane comprises a vinyl silsesquioxane.

Item 13 is the transfer tape of item 1 to item 12, wherein the backfill layer is capable of being cured by actinic radiation.

Item 14 is the transfer tape of item 1 to item 13, wherein the backfill layer is capable of being cured thermally.

Item 15 is the transfer tape of item 1 to item 14, wherein the backfill layer comprises a composite material.

Item 16 is the transfer tape of item 15, wherein the composite material comprises a nanoparticle-filled silsesquioxane.

Item 17 is the transfer tape of item 1 to item 16, wherein the diffuser layer comprises a particle-filled portion of the backfill layer.

Item 18 is the transfer tape of item 1 to item 17, wherein the structured surface comprises surface features greater than about 10 microns in height.

Item 19 is the transfer tape of item 1 to item 18, wherein the backfill layer is disposed in a pattern on the template layer.

Item 20 is the transfer tape of item 19, wherein the pattern comprises a plurality of islands, lines, or a combination of islands and lines.

Item 21 is the transfer tape of item 19, wherein the pattern comprises a gradient in areal density.

Item 22 is the transfer tape of item 1 to item 21, wherein the template layer is capable of decomposing at a lower temperature than the backfill layer.

Item 23 is the transfer tape of item 1 to item 22, wherein the structured surface comprises a microoptical refractive surface.

Item 24 is a transfer tape, comprising: a template layer having a structured surface; and a backfill layer disposed on at least a portion of the template layer, the backfill layer comprising a highly branched organosilicon material having a planar surface opposite the transfer layer coating, wherein the backfill layer is disposed in a pattern on the template layer.

Item 25 is the transfer tape of item 24, wherein the backfill layer is capable of adhering to a glass surface, and the template layer is capable of being removed from the curable inorganic transfer layer.

Item 26 is the transfer tape of item 24 or item 25, wherein the highly branched organosilicon material comprises highly branched organosilicon oligomers, highly branched organosilicon polymers, or combinations thereof.

Item 27 is the transfer tape of item 24 to item 26, further comprising a carrier film disposed on a planar surface of the template layer opposite the structured surface.

Item 28 is the transfer tape of item 24 to item 27, further comprising a transfer layer disposed on and conforming to the structured surface.

Item 29 is the transfer tape of item 24 to item 28, wherein the transfer layer comprises a transfer release coating.

Item 30 is the transfer tape of item 24 to item 29, wherein the transfer layer comprises at least one inorganic layer.

Item 31 is the transfer tape of item 30, wherein the at least one inorganic layer comprises an inorganic thin film stack.

Item 32 is the transfer tape of item 31, wherein the inorganic thin film stack comprises a low emissivity coating.

Item 33 is the transfer tape of item 24 to item 32, further comprising a diffuser layer disposed adjacent the planar surface.

Item 34 is the transfer tape of item 33, wherein the index of refraction of the diffuser layer is different than the index of refraction of the backfill layer.

Item 35 is the transfer tape of item 33, further comprising a separation layer disposed between the diffuser layer and the planar surface, wherein the index of refraction of the separation layer is different than the index of refraction of the backfill layer.

Item 36 is the transfer tape of item 24 to item 35, wherein the backfill layer comprises a silsesquioxane.

Item 37 is the transfer tape of item 36, wherein the silsesquioxane comprises a vinyl silsesquioxane.

Item 38 is the transfer tape of item 24 to item 37, wherein the backfill layer is capable of being cured by actinic radiation.

Item 39 is the transfer tape of item 24 to item 38, wherein the backfill layer is capable of being cured thermally.

Item 40 is the transfer tape of item 24 to item 39, wherein the backfill layer comprises a composite material.

Item 41 is the transfer tape of item 40, wherein the composite material comprises a nanoparticle-filled silsesquioxane.

Item 42 is the transfer tape of item 33 to item 41, wherein the diffuser layer comprises a particle-filled portion of the backfill layer.

Item 43 is the transfer tape of item 24 to item 42, wherein the structured surface comprises surface features greater than about 10 microns in height.

Item 44 is the transfer tape of item 24 to item 43, wherein the pattern comprises a plurality of islands, lines, or a combination of islands and lines.

Item 45 is the transfer tape of item 24 to item 44, wherein the pattern comprises a gradient in areal density.

Item 46 is the transfer tape of item 24 to item 45, wherein the template layer is capable of decomposing at a lower temperature than the backfill layer.

Item 47 is the transfer tape of item 24 to item 46, wherein the structured surface comprises a microoptical refractive surface.

Item 48 is a microoptical glazing, comprising: a pane of glass having a major surface; a microoptical layer bonded to at least a portion of the major surface, the microoptical layer comprising a cured backfill layer comprising a highly branched organosilicon material having a planar surface immediately adjacent the major surface and an opposing structured surface, wherein the structured surface is adjacent a low index material having an index of refraction lower than the cured backfill layer.

Item 49 is the microoptical glazing of item 48, wherein the low index material comprises a gas, a diffuser layer, or a separation layer.

Item 50 is the microoptical glazing of item 48 or item 49, wherein the cured backfill layer comprises a silsesquioxane.

Item 51 is the microoptical glazing of item 48 to item 50, wherein the cured backfill layer comprises a composite material.

Item 52 is the microoptical glazing of item 51, wherein the composite material comprises a nanoparticle-filled silsesquioxane.

Item 53 is the microoptical glazing of item 48 to item 52, wherein the structured surface comprises a microoptical refractive surface.

Item 54 is the microoptical glazing of item 48 to item 53, wherein bonding the microoptical layer comprises curing the transfer layer in contact with the major surface.

Item 55 is the microoptical glazing of item 48 to item 54, wherein the microoptical layer comprises a cured silsesquioxane.

Item 56 is the microoptical glazing of item 48 to item 55, wherein the structured surface comprises surface features greater than about 10 microns in height.

Item 57 is the microoptical glazing of item 48 to item 56, wherein the microoptical layer is continuous over a portion of the major surface.

Item 58 is the microoptical glazing of item 57, wherein the portion is adjacent a top edge of the pane of glass.

Item 59 is the microoptical glazing of item 48 to item 58, wherein the microoptical layer includes a pattern comprising planar regions adjacent to structured surface regions.

Item 60 is the microoptical glazing of item 59, wherein the pattern comprises a plurality of islands, lines, or a combination of islands and lines.

Item 61 is the microoptical glazing of item 59 or item 60, wherein the pattern comprises a gradient in areal density of the structured surface regions.

Item 62 is the microoptical glazing of item 58 to item 61, wherein an area fraction of the structured surface regions at the top edge is >90% and the area fraction of the structured surface regions at an opposing bottom edge is <10%.

Item 63 is the microoptical glazing of item 48 to item 62, wherein the cured backfill layer further comprises a diffuser adjacent the planar surface.

Item 64 is the microoptical glazing of item 63, wherein the diffuser comprises a particle-filled portion of the cured backfill layer.

Item 65 is the microoptical glazing of item 63 or item 64, wherein the diffuser comprises inorganic particles.

Item 66 is the microoptical glazing of item 63 to item 65, further comprising a separation layer disposed between the diffuser and the structured surface, wherein the index of refraction of the separation layer is different than the index of refraction of the diffuser.

Item 67 is an insulated glazing unit, comprising: a first pane of glass separated by a gap from a second pane of glass facing the first pane of glass, each of the first and second panes of glass having an interior surface adjacent the gap; and a microoptical layer bonded to at least a portion of the interior surface of at least one of the first and second panes of glass, the microoptical layer comprising a cured backfill layer comprising a highly branched organosilicon material having a planar surface immediately adjacent the interior surface and an opposing structured surface, wherein the structured surface is adjacent a low index material having an index of refraction lower than the cured backfill layer.

Item 68 is the insulated glazing unit of item 67, further comprising a transfer layer disposed on and conforming to the structured surface.

Item 69 is the insulated glazing unit of item 67 or item 68, wherein the transfer layer comprises at least one inorganic layer.

Item 70 is the insulated glazing unit of item 69, wherein the at least one inorganic layer comprises an inorganic thin film stack.

Item 71 is the insulated glazing unit of item 70, wherein the inorganic thin film stack comprises a low emissivity coating.

Item 72 is the insulated glazing unit of item 67 to item 71, wherein the low index material comprises a gas, a diffuser layer, or a separation layer.

Item 73 is the insulated glazing unit of item 67 to item 72, wherein the cured backfill layer comprises a silsesquioxane.

Item 74 is the insulated glazing unit of item 67 to item 73, wherein the cured backfill layer comprises a composite material.

Item 75 is the insulated glazing unit of item 74, wherein the composite material comprises a nanoparticle-filled silsesquioxane.

Item 76 is the insulated glazing unit of item 67 to item 75, wherein the structured surface comprises a microoptical refractive surface.

Item 77 is the insulated glazing unit of item 67 to item 76, wherein bonding the microoptical layer comprises curing the transfer layer in contact with the interior surface.

Item 78 is the insulated glazing unit of item 67 to item 77, wherein the microoptical layer comprises a cured silsesquioxane.

Item 79 is the insulated glazing unit of item 67 to item 78, wherein the structured surface comprises surface features greater than about 10 microns in height.

Item 80 is the insulated glazing unit of item 67 to item 79, wherein the microoptical layer is continuous over a portion of the interior surface of at least one of the first and second panes of glass.

Item 81 is the insulated glazing unit of item 80, wherein the portion is adjacent a top edge of the insulated glazing unit.

Item 82 is the insulated glazing unit of item 67 to item 81, wherein the microoptical layer includes a pattern comprising planar regions adjacent to structured surface regions.

Item 83 is the insulated glazing unit of item 82, wherein the pattern comprises a plurality of islands, lines, or a combination of islands and lines.

Item 84 is the insulated glazing unit of item 82 or item 83, wherein the pattern comprises a gradient in areal density of the structured surface regions.

Item 85 is the insulated glazing unit of item 81 to item 84, wherein an area fraction of the structured surface regions at the top edge is >90% and the area fraction of the structured surface regions at an opposing bottom edge is <10%.

Item 86 is the insulated glazing unit of item 67 to item 85, wherein the cured backfill layer further comprises a diffuser adjacent the planar surface.

Item 87 is the insulated glazing unit of item 86, wherein the diffuser comprises a particle-filled portion of the cured backfill layer.

Item 88 is the insulated glazing unit of item 86 or item 87, wherein the diffuser comprises inorganic particles.

Item 89 is the insulated glazing unit of item 86 to item 88, further comprising a separation layer disposed between the diffuser and the structured surface, wherein the index of refraction of the separation layer is different than the index of refraction of the diffuser.

Item 90 is a sunlight redirecting window, comprising: an insulated glazing unit, comprising: a first pane of glass having an outside surface and separated by a gap from a second pane of glass having an inside surface, each of the first and second panes of glass having an interior surface adjacent the gap; and a microoptical layer bonded to at least a portion of the interior surface of the second pane of glass, the microoptical layer comprising a cured backfill layer comprising a highly branched organosilicon material having a planar surface immediately adjacent the interior surface and an opposing structured surface, wherein the structured surface is adjacent a gas filling the gap, such that sunlight passing through the outside surface is refracted by the structured surface before passing through the inside surface.

Item 91 is the sunlight redirecting window of item 90, further comprising a diffuser positioned between the structured surface and the interior surface.

Item 92 is the transfer tape of item 1 to item 47, further comprising an integral photomask for patterning the transfer layer.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A transfer tape, comprising:
   a template layer having a structured surface;
   a backfill layer disposed on at least a portion of the template layer, the backfill layer comprising a thermal- or radiation-curable material having a planar surface opposite the structured surface; and
   a diffuser layer disposed adjacent the planar surface,
   wherein the diffuser layer is capable of adhering to a glass surface, and the template layer is capable of being removed from the backfill layer.

2. The transfer tape of claim 1, wherein the thermal- or radiation curable backfill material comprises polyurethanes, polyepoxides, polyacrylates, silicones, or combinations thereof.

3. The transfer tape of claim 1, wherein the backfill layer comprises silsesquioxane.

4. The transfer tape of claim 1, wherein the diffuser layer comprises a tackified silicone polyoxamide resin.

5. The transfer tape of claim 1, wherein the structured surface comprises surface features greater than about 10 microns in height.

6. The transfer tape of claim 1, wherein the pattern comprises a plurality of islands, dots, lines, solid areas, solid areas with holes, or a combination thereof that extend over a surface of a receptor substrate and optionally comprise a gradient in areal density of the structured surface.

7. A transfer tape, comprising:
   a template layer having a structured surface; and
   a backfill layer disposed on at least a portion of the template layer, the backfill layer comprising a thermal- or radiation-curable material having a planar surface opposite the structured surface,
   a diffuser layer disposed adjacent the planar surface,
   wherein the backfill layer and the diffuser layer are essentially coextensive and disposed in a pattern on the template layer and the diffuser layer is capable of adhering to a glass surface.

8. The transfer tape of claim 7, wherein the thermal- or radiation curable backfill material comprises polyurethanes, polyepoxides, polyacrylates, silicones, or combinations thereof.

9. The transfer tape of claim 7, wherein the backfill layer comprises silsesquioxane.

10. The transfer tape of claim 9, wherein the diffuser layer comprises a tackified silicone polyoxamide resin.

11. The transfer tape of claim 7, wherein the structured surface comprises surface features greater than about 10 microns in height.

12. The transfer tape of claim 7, wherein the pattern comprises a plurality of islands, dots, lines, solid areas, solid areas with holes, or a combination thereof that extend over a surface of a receptor substrate and optionally comprise a gradient in areal density of the structured surface.

* * * * *